US010705725B2

(12) United States Patent
McClean et al.

(10) Patent No.: US 10,705,725 B2
(45) Date of Patent: Jul. 7, 2020

(54) COMPUTING DEVICE WITH DETACHABLE WRITING INPUT DEVICE

(71) Applicant: Microsoft Technology Licensing, LLC, Redmond, WA (US)

(72) Inventors: Martin Alexander McClean, Redmond, WA (US); Jan-Kristian Markiewicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 15/991,537

(22) Filed: May 29, 2018

(65) Prior Publication Data

US 2019/0369859 A1 Dec. 5, 2019

(51) Int. Cl.
*G06F 1/16* (2006.01)
*G06F 3/0488* (2013.01)
(Continued)

(52) U.S. Cl.
CPC ........ *G06F 3/04883* (2013.01); *G06F 1/1669* (2013.01); *G06F 3/03545* (2013.01); *G06K 9/00416* (2013.01); *G06F 3/03547* (2013.01)

(58) Field of Classification Search
CPC .. G06F 3/03545; G06F 3/04883; G06F 3/041; G06F 3/0416; G06F 3/0547;
(Continued)

(56) References Cited

U.S. PATENT DOCUMENTS 6,700,773 B1 * 3/2004 Adriaansen ........... G06F 1/1618
345/156
9,360,893 B2 6/2016 Bathiche et al.
(Continued)

FOREIGN PATENT DOCUMENTS

EP 2323010 A2 5/2011
EP 2947580 A1 11/2015

OTHER PUBLICATIONS

"Microsoft Prototype Keyboard Has E-Ink Panel," available at <<https://www.technobuffalo.com/2015/08/29/microsoft-prototype-keyboard-has-e-ink-panel/>>, technobuffalo, Aug. 29, 2015, 16 pages.
(Continued)

*Primary Examiner* — Hong Zhou

(57) ABSTRACT

A computing device is described herein for capturing handwritten marks. It includes a main computing unit and a detachable writing input device joined by a connecting mechanism. The main computing unit includes a main display device, while the writing input device hosts a keyboard and a writing surface. The writing surface, in turn, includes a digitizer for capturing ink data in response to a user drawing on the writing surface, and writing display device for displaying ink strokes associated with the ink data that has been captured. A transfer control component transfers the ink data captured by the writing input device to the main computing unit upon a triggering event, such as the reconnection of the writing input device to the main computing unit. The computing device also includes a clustering component for classifying note pages received from the writing input device into one or more categories of notes.

20 Claims, 15 Drawing Sheets

(51) Int. Cl.
*G06K 9/00* (2006.01)
*G06F 3/0354* (2013.01)

(58) Field of Classification Search
CPC .... G06F 1/1632; G06F 1/1669; G06F 17/242; G06F 1/1616; G06F 3/0412; G06F 1/1643; G06F 3/02; G06F 1/203; G06F 13/00; G06F 1/3203; G06F 3/14; G06G 3/0547; G06K 9/00416
See application file for complete search history.

(56) References Cited

U.S. PATENT DOCUMENTS

| | | | |
|---|---|---|---|
| 2008/0291175 A1* | 11/2008 | Borgaonkar | G06F 1/1616 345/173 |
| 2009/0000830 A1 | 1/2009 | Kim et al. | |
| 2009/0055413 A1 | 2/2009 | Audet | |
| 2010/0013675 A1* | 1/2010 | Bennett | G06F 3/038 341/5 |
| 2010/0245294 A1 | 9/2010 | Piersol et al. | |
| 2011/0310129 A1 | 12/2011 | Nakahara | |
| 2012/0194448 A1* | 8/2012 | Rothkopf | A45C 13/002 345/173 |
| 2013/0229386 A1* | 9/2013 | Bathiche | G06F 1/1654 345/175 |
| 2014/0043547 A1 | 2/2014 | Marhefka | |
| 2014/0146074 A1 | 5/2014 | Kwon | |
| 2014/0247546 A1 | 9/2014 | Whitt, III et al. | |
| 2014/0362011 A1* | 12/2014 | Niwa | B42F 9/002 345/173 |
| 2015/0054797 A1 | 2/2015 | Takahashi et al. | |
| 2016/0294839 A1 | 10/2016 | Walline et al. | |
| 2018/0067638 A1 | 3/2018 | Klein et al. | |
| 2018/0181221 A1* | 6/2018 | Nakajima | G06F 3/038 |
| 2018/0314882 A1* | 11/2018 | Yu | G06K 9/00422 |

OTHER PUBLICATIONS

"Cholesteric liquid crystal," available at <<https://en.wikipedia.org/wiki/Cholesteric_liquid_crystal>>, accessed on Apr. 28, 2018, Wikipedia article, 2 pages.
Warren, Tom, "Microsoft's future of Windows is clever modes for clever hardware," available at <<https://www.theverge.com/2018/3/12/17108958/microsoft-windows-future-c-shell-andromeda-polaris>>, The Verge, Mar. 12, 2018, 4 pages.
Duncan, et al., "TWC9: Windows 10 on 75, Windows 95 is 20, 10 by 10 for Windows 10 and more . . . ," available at <<https://channel9.msdn.com/Shows/This+Week+On+Channel+9/TWC9-Windows-10-on-75-Windows-95-is-20-10-by-10-for-Windows-10-and-more#time=8m52s>>, accessed on May 4, 2018, Microsoft Corporation, Channel 9, Aug. 28, 2015, 10 pages.
"Electronic paper," available at <<https://en.wikipedia.org/wiki/Electronic_paper>>, accessed on Apr. 26, 2018, Wikipedia article, 12 pages.
Keane, et al., U.S. Appl. No. 15/479,073, "Foldable Display Device With Interactable User Interface Surface on the External Shell," filed Apr. 4, 2017, 29 pages.
Cabaccang, et al., U.S. Appl. No. 15/478,963, "Foldable Display Device With Interactable User Interface Surface on the External Shell," filed Apr. 4, 2017, 29 pages.
Invitation to Pay Additional Fees, and Communication Related to the Results of the Partial International Search, PCT Application No. PCT/US2019/031936, dated Aug. 1, 2019, 16 pages.
Search Report and Written Opinion in PCT Application No. PCT/US2019/031936, dated Oct. 16, 2019, 23 pages.

* cited by examiner

OVERVIEW OF OPERATION OF THE COMPUTING DEVICE
2102

RECEIVE INK DATA CAPTURED BY A WRITING INPUT DEVICE, AS A USER DRAWS ON A WRITING SURFACE OF THE WRITING INPUT DEVICE
2104

DISPLAY INK STROKES ON THE WRITING SURFACE ASSOCIATED WITH THE INK DATA THAT HAS BEEN CAPTURED BY THE WRITING SURFACE
2106

STORE THE INK DATA IN A DATA STORE PROVIDED BY THE WRITING INPUT DEVICE
2108

DETECT OCCURRENCE OF A TRIGGERING EVENT
2110

IN RESPONSE TO THE TRIGGERING EVENT, TRANSFER THE INK DATA FROM THE DATA STORE OF THE WRITING INPUT DEVICE TO A MAIN COMPUTING UNIT
2112

FIG. 21

OPERATION OF THE CLUSTERING COMPONENT
2202

RECEIVE PLURAL NOTE PAGES PRODUCED BY A WRITING INPUT DEVICE OF A COMPUTING DEVICE, THE PLURAL NOTE PAGES BEING PRODUCED OVER A SPAN OF TIME
2204

RECEIVE FACTOR INFORMATION FROM AT LEAST ONE SOURCE THAT DESCRIBES ONE OR MORE CHARACTERISTICS OF THE PLURAL NOTE PAGES
2206

GROUP THE PLURAL NOTE PAGES INTO ONE OR MORE CATEGORIES OF NOTES BASED THE FACTOR INFORMATION THAT IS RECEIVED IN BLOCK 2206
2208

FIG. 22

COMPUTING DEVICE WITH DETACHABLE WRITING INPUT DEVICE

BACKGROUND

A user may utilize various types of portable computing devices to take notes. For instance, the user may use a digital pen to write notes on the display device of a laptop computing device, the display device being generally oriented in a vertical plane relative to the laptop computing device's keyboard. This solution, however, is not fully satisfactory.

SUMMARY

A computing device is described herein for capturing handwritten marks. It includes a main computing unit and a detachable writing input device, joined by a connecting mechanism. The main computing unit includes a main display device, while the writing input device hosts a keyboard and a writing surface. The writing surface, in turn, includes a digitizer for capturing ink data in response to a user drawing on the writing surface, and a writing display device for displaying ink strokes associated with the ink data that has been captured by the digitizer.

According to one illustrative aspect, the keyboard and the writing surface are located on opposite sides of the writing input device.

According to another illustrative aspect, the writing input device consumes less power than the main computing unit. This characteristic allows the user to take notes in a resource-efficient manner.

According to another technical aspect, a user may interact with the writing input device in a manner similar to a physical pad of paper. This capability improves the user's note-taking experience, e.g., by not requiring the user to assume an unnatural posture while taking notes.

According to another illustrative aspect, a transfer control component transfers the ink data captured by the writing input device to the main computing unit upon the occurrence of a triggering event. For example, the triggering event may correspond to an occasion in which a user reconnects the writing input device to the main computing unit.

According to another illustrative aspect, a clustering component clusters plural note pages received from the writing input device into one or more categories of notes based on factor information (such as time information, calendar information, recognized ink information, etc.).

According to another illustrative aspect, a content-selecting component determines a current context affecting a user, such the manner in which the user is currently interacting with the main computing unit, the user's current location, the current time, etc. It then maps the context to content to be presented by the writing input device. The transfer control component then provides the identified content to the writing input device for presentation on the writing surface.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 21 shows a process that describes one manner of operation of the computing device of FIG. 1.

FIG. 22 shows a process that describes one manner of operation of the clustering component of FIG. 16.

Figure 1:
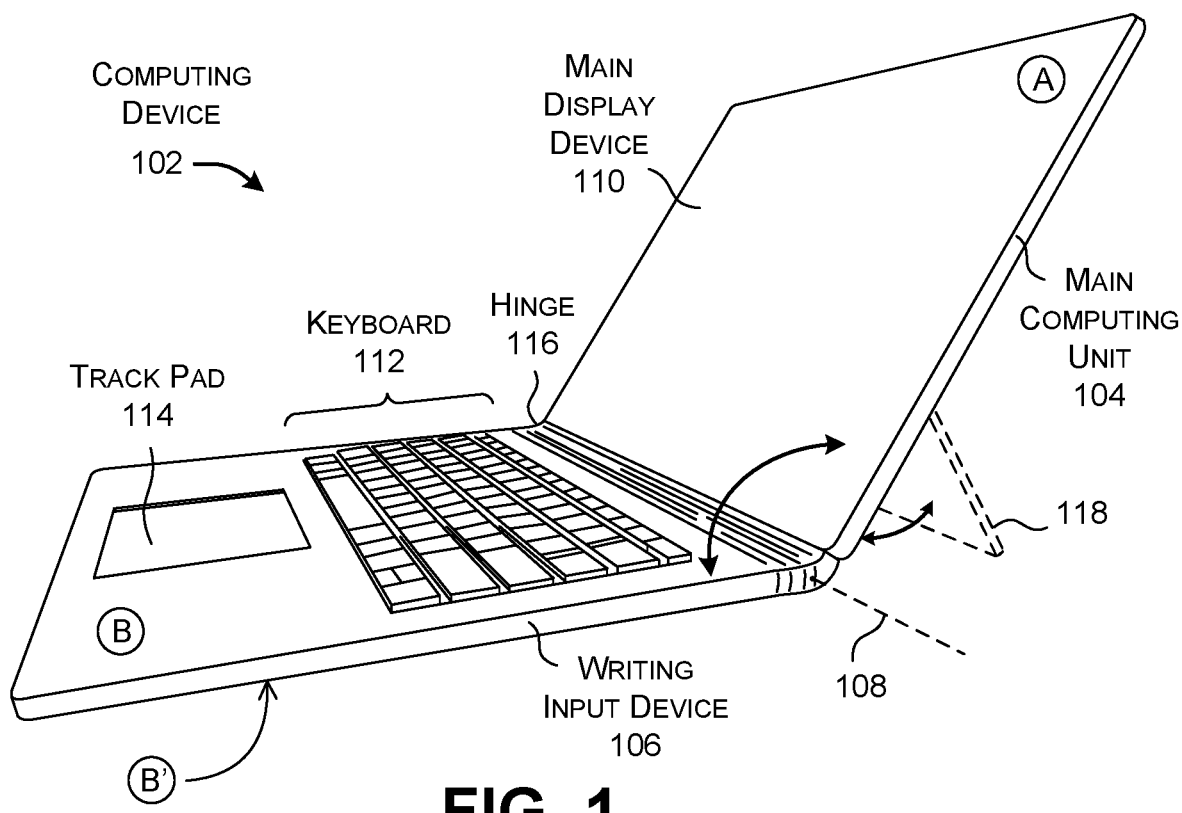
FIG. 1 shows an illustrative computing device having a main computing unit coupled to a detachable writing input device, in an open state.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing device having a writing input device detachably coupled to a main computing unit. Section B sets forth illustrative methods which explain the operation of the computing environment of Section A.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section A provides additional information regarding one implementation of the hardware logic circuitry.

The term "component" refers to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section A, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section A. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section A. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Device

FIG. 1 shows an illustrative computing device 102 having a main computing unit 104 coupled to a detachable writing input device 106. The main computing unit 104 includes a first housing, while the writing input device 106 includes a second housing. The housings may be made of any suitable material, such as plastic, metal, etc., or any combination thereof. The computing device 102 shown in FIG. 1 has a form factor corresponding to a laptop computing device. But the principles described herein apply to other multi-part computing devices having different sizes and shapes and primary uses. For example, the principles described herein apply to a smartphone (not shown) having a detachable input device.

The main computing unit 104 rotates around an axis 108 relative to the writing input device 106. In the state shown in FIG. 1, the computing device 102 is in its open state, meaning that the main computing unit 104 and the writing input device 106 are separated from each other by a non-zero angle with respect to the axis 108.

In one implementation, the main computing 104 hosts a computing system (described more fully in connection with FIG. 12) that allows it to operate on its own, without the writing input device 106. It includes a main display device 110 for presenting a user interface presentation on a first side (side A). For example, the main display device 110 may correspond to a Liquid Crystal Display (LCD) device having a protective glass or plastic outer surface layer. In some implementations, the main computing unit 104 can include a digitizer that is coextensive with the surface of the main display device 110 for receiving inputs via a pen of any type or any other writing implement (including a user's finger). Exemplary digitizer technology will be described below in connection with FIGS. 7-11.

In one implementation, the writing input device 106 includes a first side (B) that includes a keyboard 112 and a trackpad 114. The user may interact with the keyboard 112 and trackpad 114 to provide input signals to the main computing unit 104. Although not shown in FIG. 1, the writing input device 106 also includes a second side (B') that includes a writing surface. The user may use a pen, finger, or other implement to draw on the writing surface.

A hinge 116 allows the main computing unit 104 and the writing input device 106 to move with respect to each other about the axis 108. The hinge 116 can be implemented using one or more interlocking hinge members (made of plastic, metal, etc.), a flexible member (made of fabric, plastic, rubber, etc.), and so on. The computing device 102 may also include one or more stopping mechanisms that restrict the movement of the main computing unit 104 relative to the writing input device 106. For example, the hinge 116 may include ribs of non-compressible material which run parallel to the longitudinal axis 108, which serve to limit the movement of the main computing unit 104 relative to the writing input device 106.

Generally, note that other kinds of main computing units, writing input devices, and/or hinges can be used to implement the technical features described herein, compared to the main computing unit 104, writing input device 106, and hinge 116 shown in FIG. 1. For instance, another computing device may incorporate a pivoting stand 118 extending from a side A' of the main computing unit 104; when swung out, this stand 118 structurally supports the main computing unit 104 relative to a surface on which the computing unit 104 rests.

Figure 2:
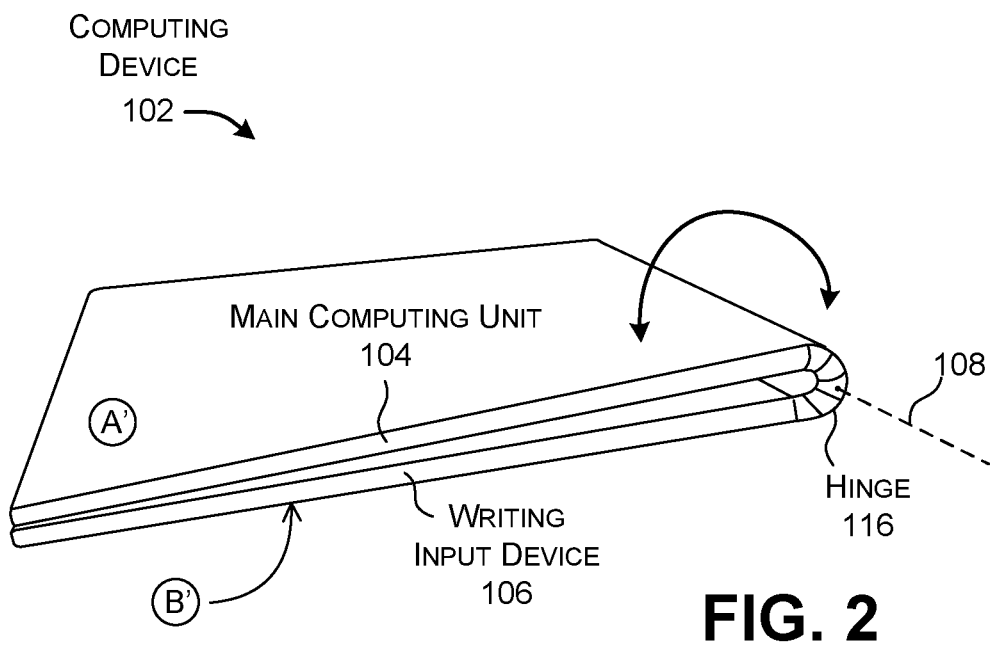
FIG. 2 shows the computing device of FIG. 2 in a closed state.

FIG. 2 shows the computing device 102 of FIG. 2 in a closed state. That is, in this state, a user has swung the main computing unit 104 about the axis 108 towards the writing input device 106, until the surface of side B of the main computing unit 104 comes into contact (or close proximity with) the surface of side A of the writing input device 106. The user may place the computing device 102 in this state when or he or she is finished using it and wishes to transport it to a new location.

Figure 3:
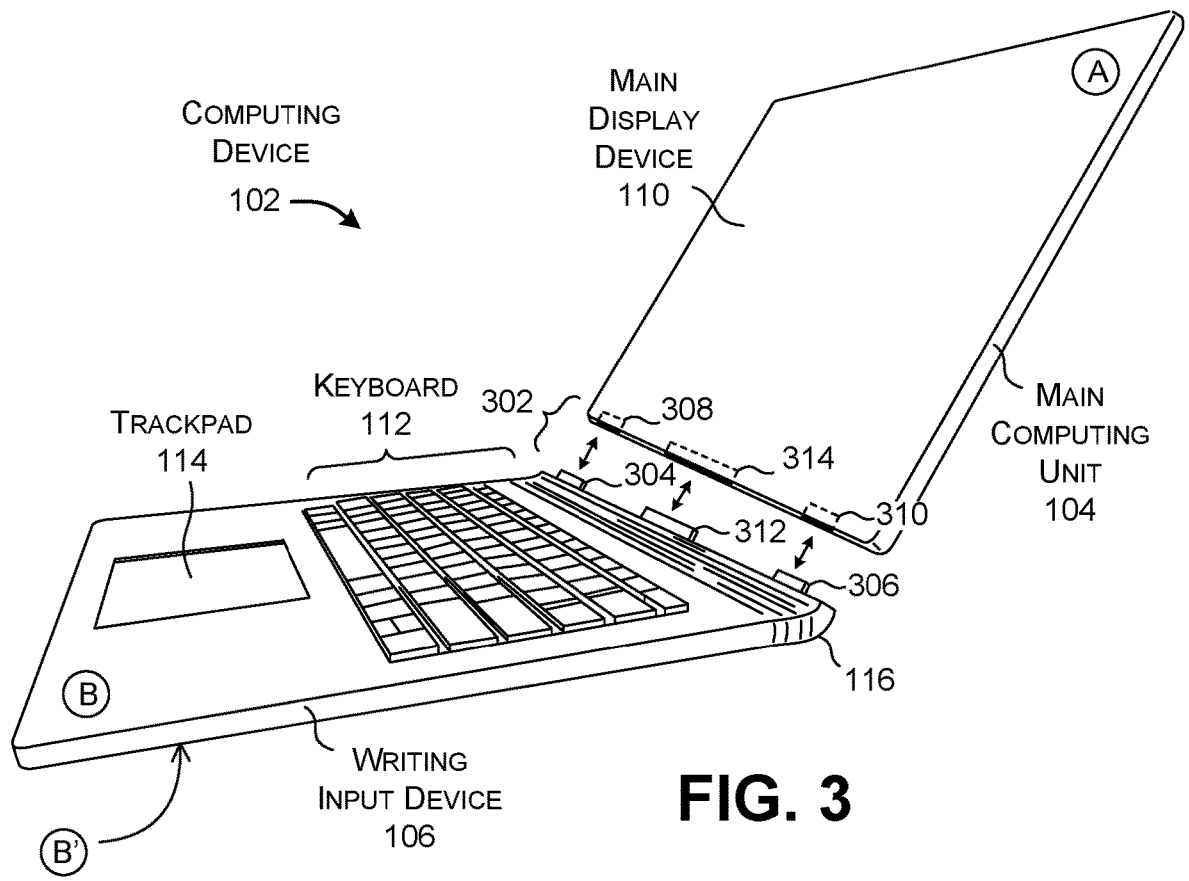
FIG. 3 shows the computing device of FIG. 1 in a state in which the writing input device is detached from the main computing unit.

FIG. 3 shows the computing device 102 of FIG. 1 in a state in which the writing input device 106 is detached from the main computing unit 104. The user may detach the main computing unit 104 from the writing input device 106 by grasping it along its top edge and pulling it away from the writing input device 106.

FIG. 3 also shows an illustrative connecting mechanism 302 that mechanically and electrically couples the main computing unit 104 to the writing input device. In this merely representative example, the writing input device 106 includes two male protrusions (304, 306) which mate with two complementary receptacles (308, 310) in the housing of the main computing unit 104. In some implementations, the male protrusions (304, 306) and/or the complementary receptacles (308, 310) can include magnets. For example, the male protrusion 304 and its complementary receptacle 308 can include an attracting pair of magnets, while the male protrusion 306 and its complementary receptacle 310 can include another attracting pair of magnets. Alternatively, or in addition, the connecting mechanism 302 can include one or more mechanical latches, one or more VELCRO strips, one or more pairs of male/female parts that snap together, one or more pairs of male/female parts that slide together, and so on.

In some implementations, the connecting mechanism 302 can also include a lock mechanism which prevents the main computing unit 104 from being removed from the writing input device 106 while in a locked state. In one non-limited case, the lock mechanism can include at least one movable pin (not shown) which applies lateral pressure against a male protrusion when the protrusion is inserted into its respective receptacle, or which slides into a hole (not shown) in a male protrusion when the protrusion is inserted into its respective receptacle. The lock mechanism can electronically move the pin in response to a user's actuation of an unlock button, or the lock mechanism can move the pin in response to manual manipulation by the user.

The connecting mechanism 302 also includes at least one male electrical connector 312 which mates with a complementary female electrical connector 314. The main computing unit 104 and the writing input device 106 can exchange data and power when the male electrical connector 312 is inserted into the female electrical connector 314. In one representative case, the connectors (312, 314) transfer data and/or power via the Universal Serial Bus (USB) protocol. Although not shown in FIG. 3, the main computing unit 104 and the writing input device 106 can also exchange data via a wireless connection (e.g., using BLUETOOTH communication, WIFI communication, etc.).

Figure 4:
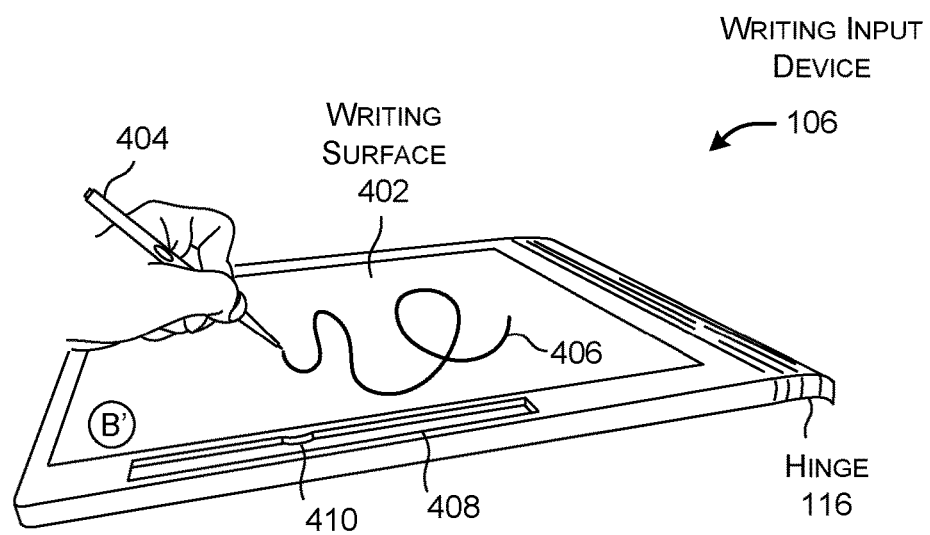
FIG. 4 shows the computing device of FIG. 1 in a state in which the writing input device is turned over (relative to the state of FIG. 3) to expose a writing surface.

FIG. 4 shows the computing device 102 of FIG. 1 in a state in which the writing input device 106 has been detached from the main computing unit 104, and after which the writing device 106 is turned over (relative to the state of FIG. 3) to expose a writing surface 402 (on side B'). The writing surface 402, in turn, includes a digitizer and a writing display device. The digitizer detects input marks produced by the user on the writing surface 402 using a writing implement or any type. In FIG. 4, the user creates the marks using a digital pen 404. The writing display device displays ink strokes 406 based on input signals detected by the digitizer. In one implementation, the writing surface 402 has a surface area that extends over at least half of the surface area of side B' of the writing input device 106. For instance, in the example of FIG. 4, the writing surface 402 extends over 90% of side B'. Additional information regarding various implementations of the writing surface 402 and pen 404 is provided below.

The writing input device 106 can optionally include a mechanism for securing the pen 404 when it is not in use. For example, the writing input device 106 shown in FIG. 4 includes a receptacle 408 in its housing for storing the pen 404, with a resilient protrusion 410 for securing the pen 404 in place. Other securing mechanisms include resilient clasps, VELCRO straps, a top-loading elongate receptacle for inserting the pen 404, and so on.

According to another illustrative aspect, at least a portion of the computing device's housing and/or the pen's housing can have a signature color, such as red or blue or green. The writing surface 402 may be configured to present ink strokes in a matching color, e.g., by presenting red ink strokes for a red-themed computing device 102. This might assist the user in remembering the association between a digital pen and the computing device 102 in those cases in which the user owns plural digital pens. It may also produce a desirable aesthetic effect.

In one manner of operation, the user may manipulate the writing surface 402 in a manner similar to a physical pad of paper. For example, a student in a classroom may lay the writing input device 106 flat on a desk surface while taking notes. Or a person attending a lecture may place the writing input device 106 in his or her lap while taking notes. This manner of interaction with the writing input device 106 provides a good user experience because the user may assume a natural posture while taking notes. By contrast, a user who writes on the surface of the main display device 110 while it is attached to the writing input device 106 may need to cock his or her hand to do so, which may be uncomfortable to the user. The writing surface 402 of the writing input device 106 may also include a top surface having a roughness that simulates that of physical paper. This feature further improves the user's experience compared to writing on the smooth glass or plastic surface of the main display device 110.

Further, in one implementation, the writing surface 402 may correspond to a single-purpose device, or a device which performs a limited number of functions relative to the main computing unit 104. The writing surface 402 may therefore present fewer distractions to the user compared to the main computing unit 104. For example, the main computing unit 104 may provide various distracting notifications to the user, and/or may entice the user to interact with various applications (including a browser application); the writing surface 402 may optionally omit this functionality.

Figure 5:
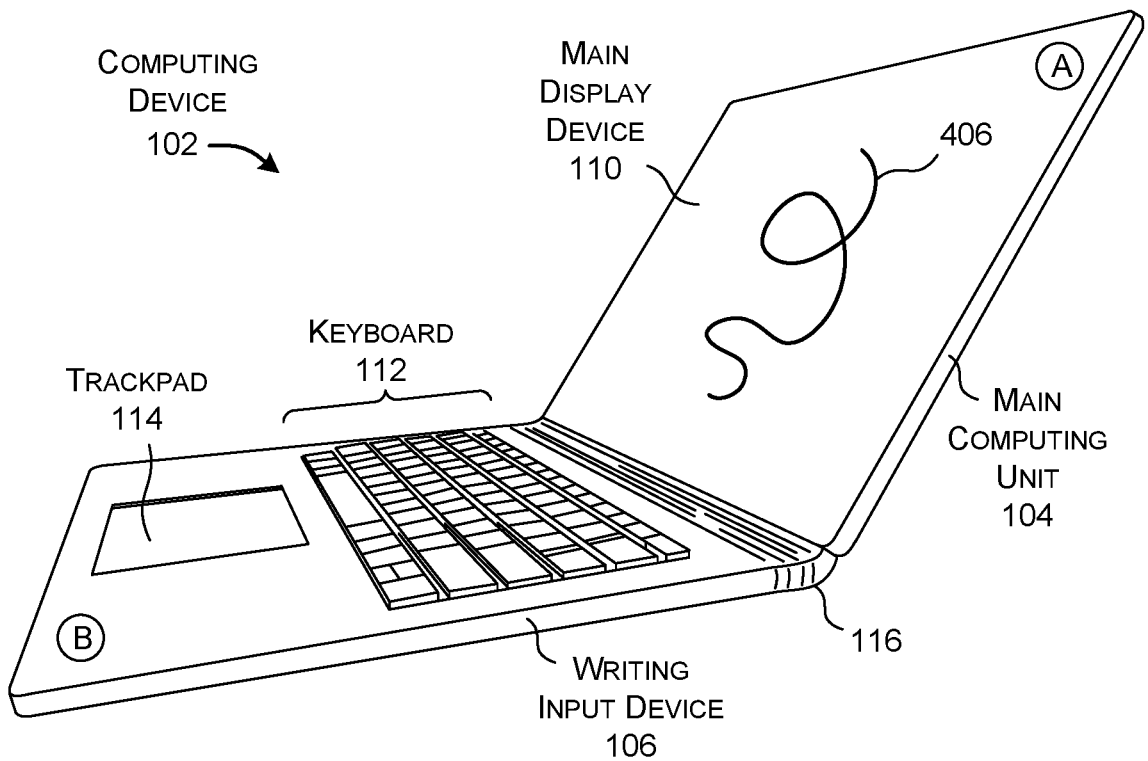
FIG. 5 shows the computing device of FIG. 1 in a state in which the writing input device is reattached to the main computing unit, after writing on the writing input device's writing surface, per the scenario of FIG. 4.

FIG. 5 shows the computing device 102 of FIG. 1 in a state in which the user has now reattached the writing input device 106 to the main computing unit 104. In one implementation, the act of reconnecting the writing input device 106 to the main computing unit 104 constitutes a triggering event. The triggering event prompts the writing input device 106 to transfer the ink data that it has collected while in a detached state to the main computing unit 104. Alternatively, or in addition, the writing input device 106 can transfer the ink data from the writing input device 106 to the main computing unit 104 via a wireless connection and/or a hardwired (e.g., cable) connection; the writing input device 106 can transfer ink data in this manner on a periodic basis, or on an on-demand manner, e.g., in response to an instruction from the user.

Upon transfer of the ink data to the main computing unit 104, the main computing unit 104 can process the ink data in any device-specific or application-specific manner. In the example of FIG. 5, the main computing unit 104 invokes a note-taking application which displays the ink strokes 406 created by the user on the main display device 110. As will be described below, the main computing unit 104 can also transfer content to the writing input device 106 for display on the writing surface 106. Such data can include previously-created ink data, a document to be marked up using the writing input device 106, etc.

Figure 6:
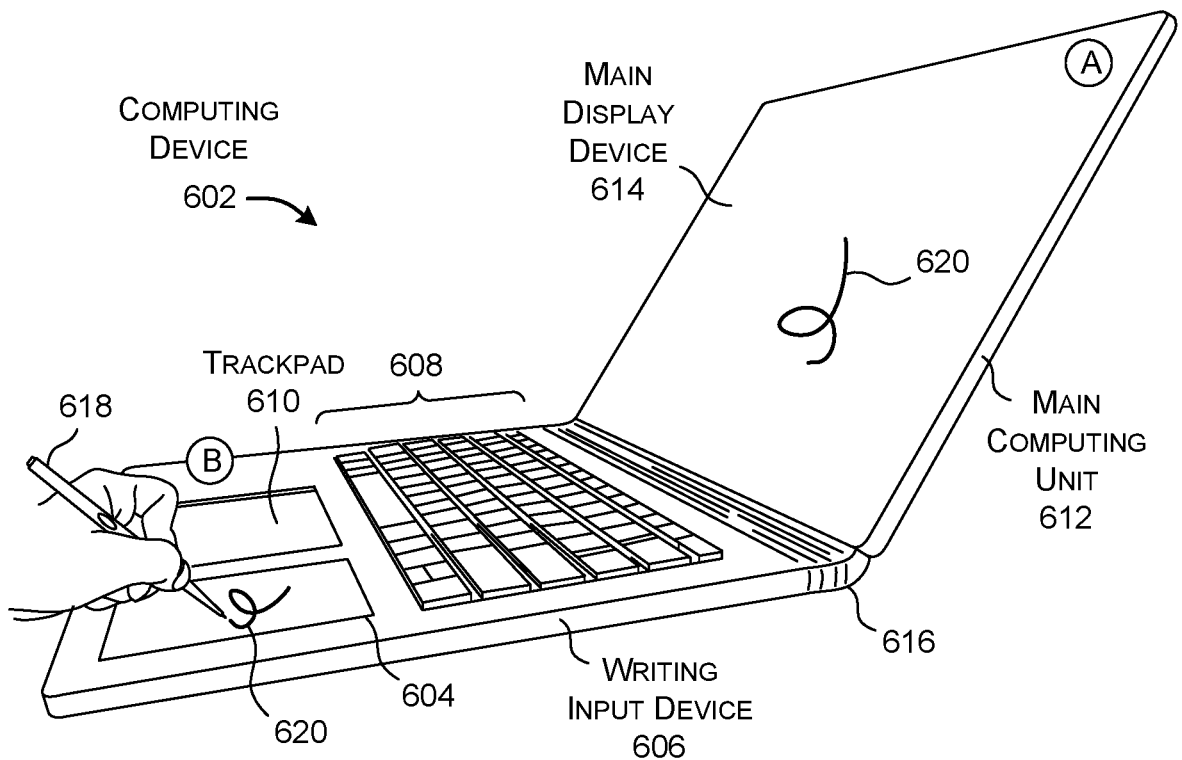
FIG. 6 shows an alternative computing device that includes a writing surface on a front side of a writing input surface.

Other computing devices can vary one or more of the features of the computing device 102 described above with respect to FIGS. 1-5. For example, FIG. 6 shows an alternative computing device 602 that includes a writing surface 604 on a front side of a writing input device 606. The writing input device 606 also includes a keyboard 608 and a trackpad 610. The writing input device 606 is detachably coupled to a main computing unit 612. The main computing unit 612 includes a main display device 614. The computing device 602 includes a hinge 616 that allows the main computing unit 612 to move relative to the writing input device 606.

In the example of FIG. 6, the user uses a digital pen 618 to make marks 620 on the writing surface 604. The writing surface 604 detects and displays these marks 620. The main computing unit 612 may simultaneously display the marks 620 on the main display device 614. Alternatively, the user may interact with the writing surface 604 while the writing input device 606 is detached from the main computing unit 612. The writing input device 606 may then transfer its ink data to the main computing unit 612 in any of the ways described above with respect to FIG. 5.

In another implementation (not shown), the computing device 602 may include a writing surface on the back (side A') of the main computing unit 612. In another implementation (not shown), the computing device 602 can include plural writing surfaces located on different respective portions of the computing device 602, such as, without limitation: two or more writing surfaces on side B of the writing input device 606; a writing surface on the side B on the writing input device 606 and a writing surface on side B' of the writing input device 606; a writing surface on side B' of the writing input device 606 and a writing surface on side A' of the main computing unit 612, and so on.

Figure 7:
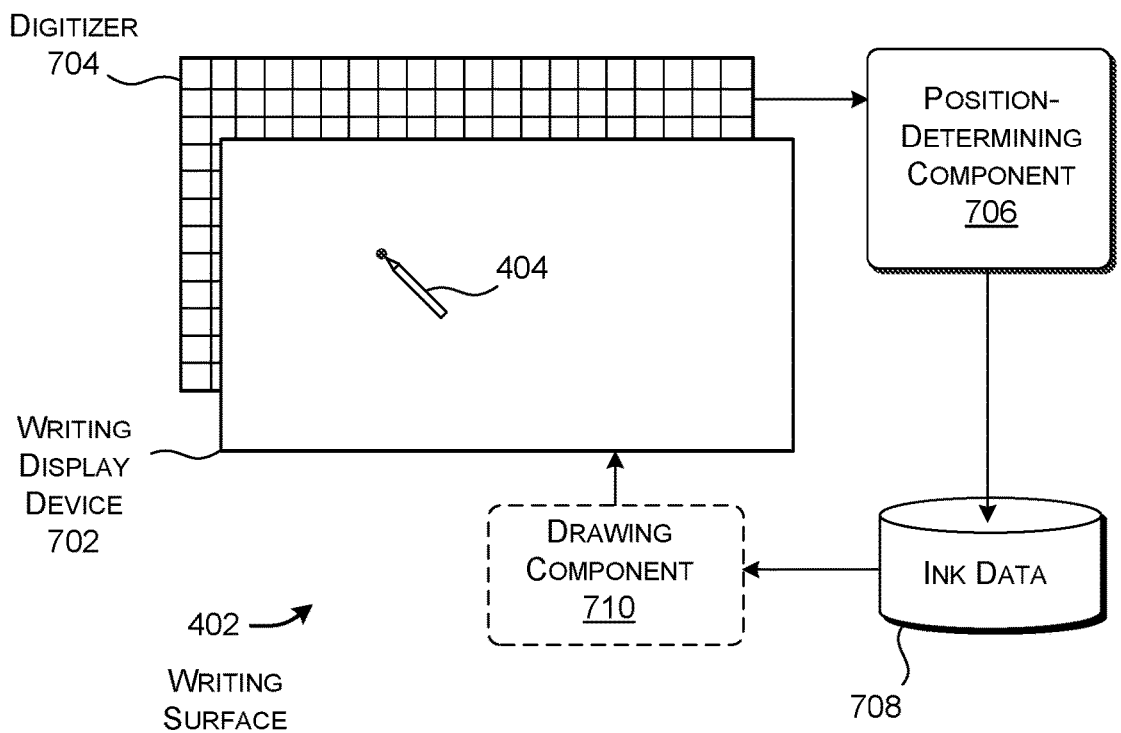
FIG. 7 shows one implementation of a writing surface for use in the computing device of FIG. 1.

FIG. 7 shows one implementation of the writing surface 402 introduced in FIG. 4. In one implementation, the writing surface 402 includes a writing display device 702 in conjunction with a digitizer 704. In one implementation, the writing display device 702 is placed over the digitizer 704 and has a surface area that is substantially coextensive therewith.

Without limitation, the writing display device 702 can include a Liquid Crystal Display (LCD) device, an Organic Light-Emitting Diode (OLED) display device, an electronic paper display device (e.g., an electrophoretic display device, an electrowetting display device, etc.), a Cholesteric Liquid Crystal Display (ChLCD) device, a projection display device, and so on. An electronic paper display device and a ChLCD display device are examples of bi-stable devices. In such a display device, a pixel maintains its visual state (e.g., white or black) upon removal of power to the display device. Such a display device requires power only to change the visual state of any pixel.

The digitizer 704 detects the position of the pen 404 or other writing implement (such a finger) on its surface. The digitizer 704 can use any technology to perform this task. For example, the digitizer 704 can include a touch-sensitive surface implemented using resistive, capacitive, optical, or acoustic technology. Alternatively, or in addition, the digitizer 704 can include an array of sensing elements for detecting signals transmitted by the pen 404.

A position-determining component 706 determines the location of the pen 404 (or other writing implement) on the writing display device 702, e.g., by determining the (x, y) location associated with the sensing elements that yield the strongest input signals. The position-determining component 706 can store ink data in a data store 708 in response to its determination. The ink data registers the location of a mark made by the user on the writing surface 402. The position-determining component 706 can also store metadata regarding each instance of ink data associated with an individual ink stroke, such as the time at which it was created, the location at which it was created (based on information provided by a GPS location-determination component), the user who created it (based on sign-in information previously supplied by the user), and so on. In some implementations, a drawing component 710 provides output signals to the writing display device 702 based on the ink data that is stored. In response to these output signals, the writing display device 702 displays a mark at a same (x, y) location detected by the digitizer 704. In other implementations, such as in the case of a ChLCD display device, the writing display device 702 displays a mark in response to pressure applied to the surface of the writing display device 702 by the pen 404 or other writing implement. Here, the writing display device 702 does not rely on output signals provided by the drawing component 710 to produce visual ink strokes. Still other implementations of the writing surface 402 are possible.

FIG. 7 shows that the position-determining component 706 is implemented as a separate component from the digitizer 704. But it can alternatively be implemented as an integral part of the digitizer 704. Similarly, FIG. 7 shows that the drawing component 710 is implemented as a separate component from the writing display device 702. But it can alternatively be implemented as an integral part of the writing display device 702.

Figure 8:
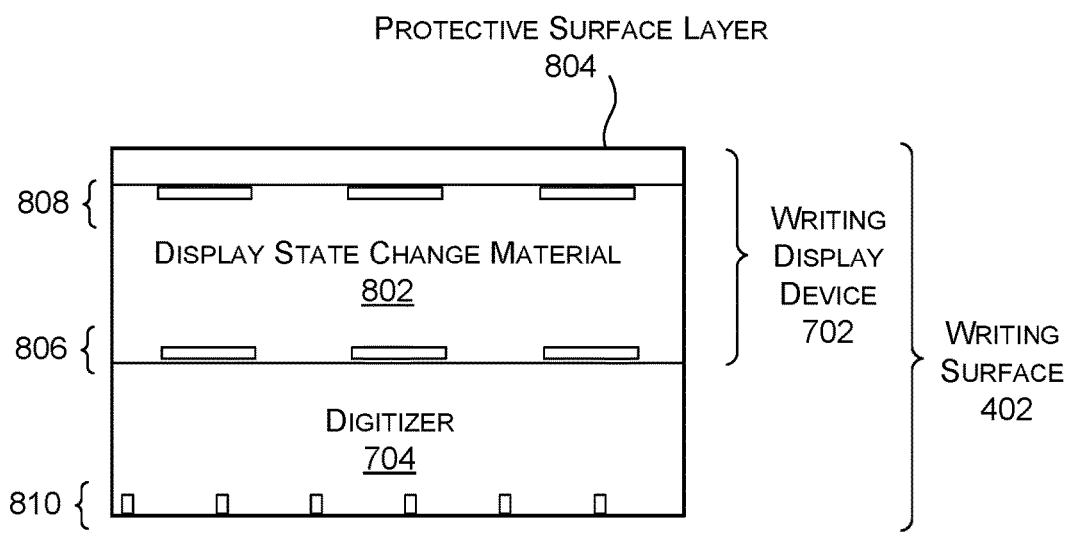
FIG. 8 shows a cross section of the writing surface of FIG. 7.

FIG. 8 shows a cross-section of part of the writing surface 402 of FIG. 7, according to one non-limiting implementation. The writing display device 702 can include a display state change material 802, topped by a protective surface layer 804. For example, in the case of an electronic paper display device, the display state change material 802 can include white-colored and black-colored charged microcapsules in a fluid (such as liquid polymer). The writing display device 702 also includes electrodes (806, 808) dispersed over its surface. A voltage applied to any electrode causes the charged particles in the vicinity of the electrode to move towards or away from it, causing, in turn, a corresponding pixel location on the writing display device 702 to appear white or black. The writing display device 702 will maintain this state even when the power is removed from it.

For a ChLCD display device, the display state change material 802 includes a cholesteric liquid material in a fluid (such as a liquid polymer). Pressure applied to the surface of the writing display device 702 produces local changes in the structure of the display state change material 802, which changes the visual properties of the material 802 at the location at which pressure has been applied. The ChLCD display device achieves and maintains this state even in the absence of power applied to the device. The ChLCD display device can include electrodes on the top and/or bottom of the display state change material 802 (not shown). The ChLCD display device can restore the display state change material 802 to its original state (and thereby effectively erase the markings produced by the writing implement) by applying appropriate voltages to the electrodes.

The protective surface layer 804 can be implemented using a rigid material (such as glass, plastic, etc.), or a flexible material (such as plastic, etc.). The protective surface layer 804 can be produced to exhibit a surface roughness that simulates the tactile experience of physical paper.

The digitizer 704 of FIG. 8 includes an array of sensing elements (a cross-section of a subset 810 of which are shown in FIG. 8). For example, in one non-limiting case, the digitizer 704 can use the sensing elements to receive electromagnetic signals from the pen 404. In some implementations, the sensing elements can also serve the dual purpose of emitting electromagnetic signals. The pen 404 may resonate with these emitted signals and thereby draw power from these signals; this eliminates the need for the pen 404 to include a separate battery.

Figure 9:
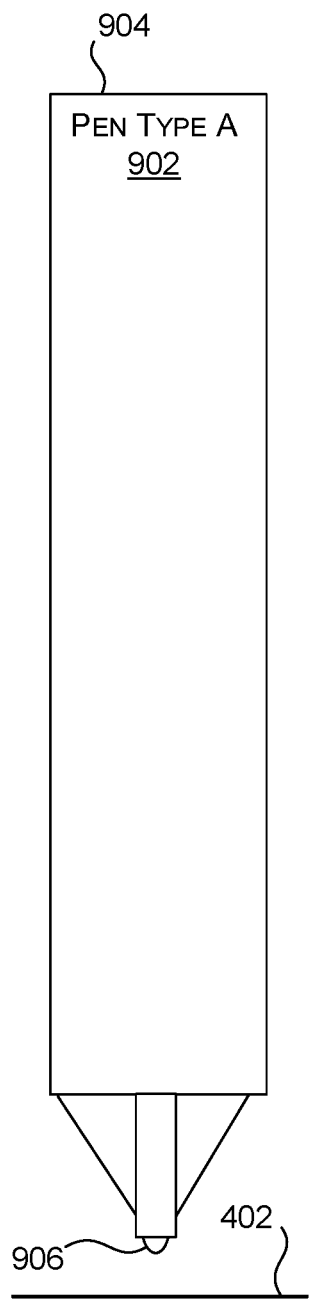
FIGS. 9-11 respectively show three illustrative pens for use in interacting with the writing surface of FIG. 7.
Figure 10:
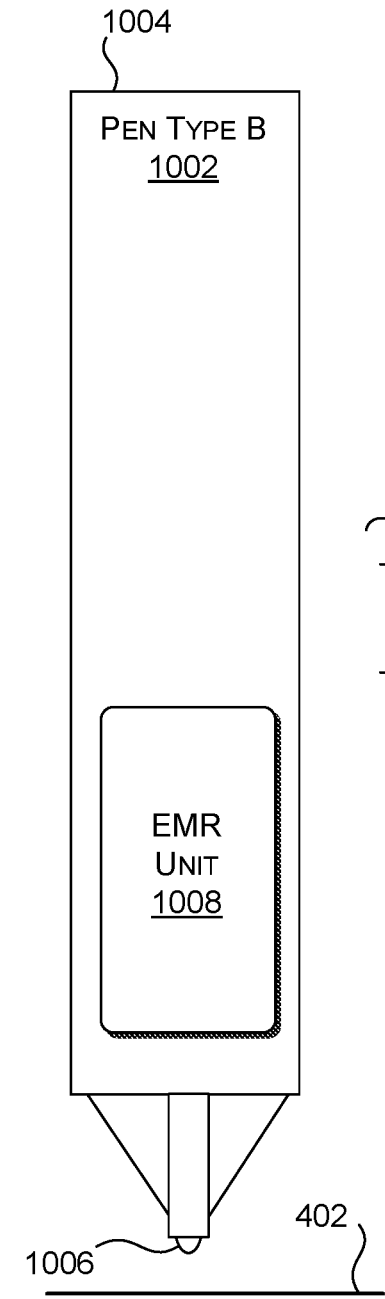
Figure 11:
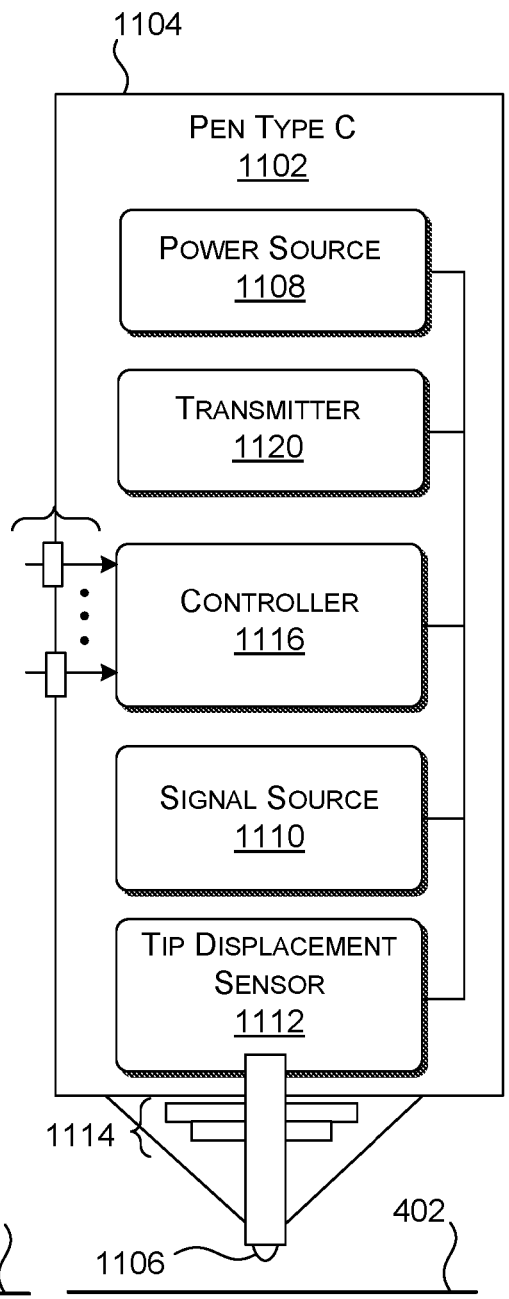

FIGS. 9-11 shows three illustrative pens (902, 1002, 1102) for use in interacting with the writing surface 402 of FIG. 7. In the case of FIG. 9, the pen 902 includes a shaft 904 and tip 906 with no internal electronic components. The digitizer 704 detects the position of the tip 906 on the writing surface 402 using a touch-sensitive surface of any type, such as a surface that uses resistive, capacitive, optical, or acoustic technology. In other words, the pen 902 can correspond to a stylus.

In the case of FIG. 10, the pen 1002 includes a shaft 1004, tip 1006, and an electromagnetic resonance (EMR) unit 1008. The EMR unit 1008 alternates between two phases in rapid succession. In a first phase, the EMR unit 1008 receives electromagnetic signals from the digitizer 704. By resonating with this received signal, it acquires power. In a second phase, the EMR unit 1008 emits its own electromagnetic signals. The digitizer 704 detects signals emitted by the pen 1002 and determines the location of the tip 1006 on the writing surface 402 based on these signals. Since the pen 1002 acquires power from the digitizer 704, it may omit its own power supply.

In some cases, the writing surface 402 includes a deformable surface that the user may depress using the pen 1002. In that implementation, the digitizer 704 can determine the pressure at which the user applies the pen 1002 to the writing surface 402 based on the strength of the signals it receives from the pen 1002, e.g., based on the premise that the signals from the pen 1002 becomes stronger in proportion to the distance it is pressed into the writing surface 402. The writing display device 702 may vary the thickness of an ink stroke based on the detected pressure.

In the case of FIG. 11, the pen 1102 includes a shaft 1104 and a tip 1106, along with a power source 1108 which powers a signal source 1110. The digitizer 704 detects the electromagnetic signals emitted by the signal source 1110 and determines the location of the tip 1106 based on these signals. The pen 1102 can optionally include a tip displacement sensor 1112 which detects the pressure at which the user applies the pen tip 1106 to the writing surface 402 (e.g., by measuring the displacement of the tip 1106, which is biased by a resilient member 1114, such as a spring). The pen 1102 can also include a data store (not shown), a controller 1116, one or more input buttons 1118 (e.g., for changing the color of the pen's ink), and a transmitter 1120 for transmitting data to the writing surface 402 (e.g., using BLUETOOTH, etc.).

The three pen options shown in FIGS. 9-11 are described in the spirit of illustration, not limitation. Yet other kinds writing implements may be used to interact with the writing input device 106. Further note that the user may also use any body part(s) (such as a finger) to interact with the writing surface 402.

Figure 12:
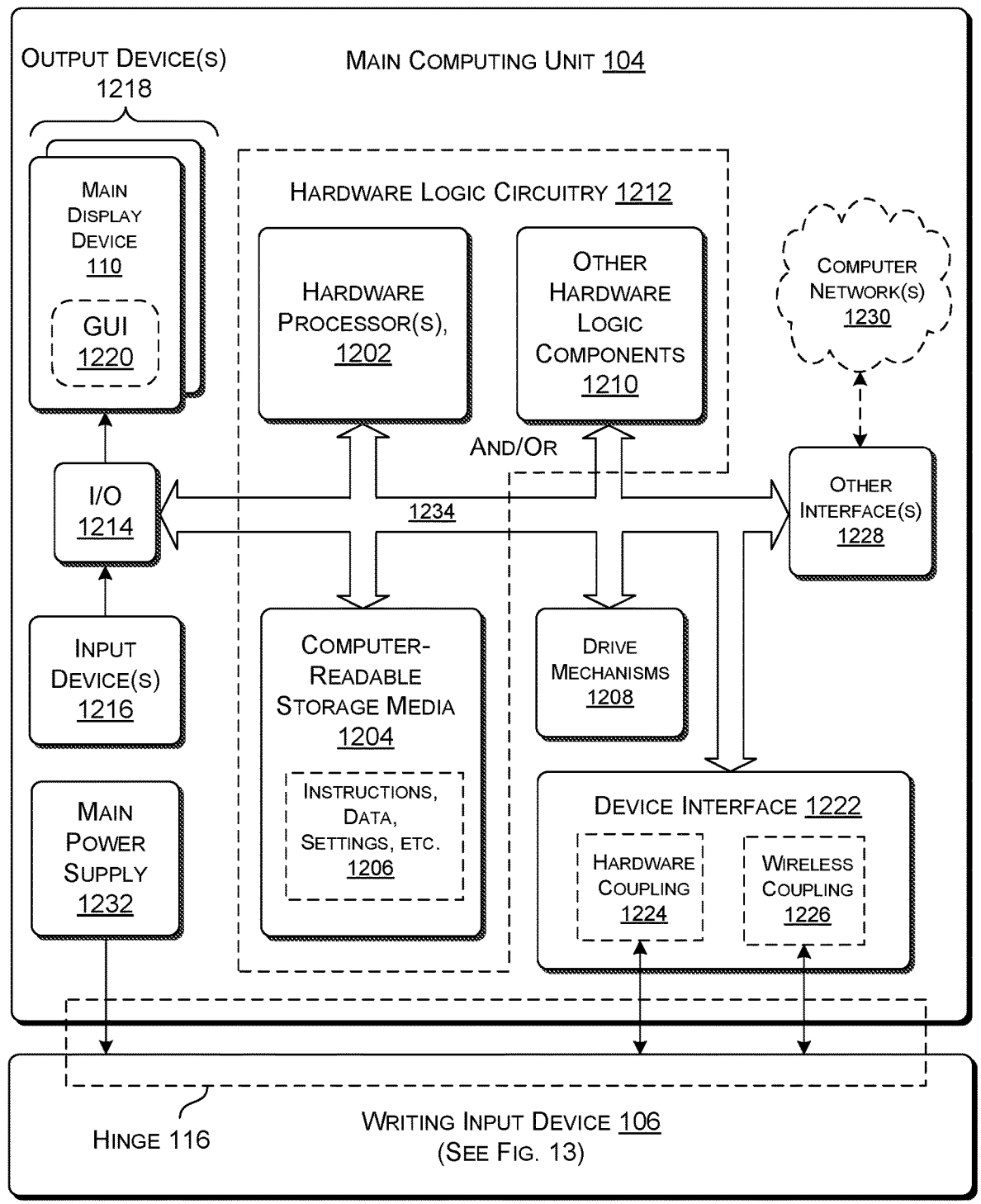
FIG. 12 shows hardware that may be used to implement the main computing unit of FIG. 1.

FIG. 12 shows hardware that may be used to implement the main computing unit 104 of FIG. 1, according to one non-limiting implementation. The main computing unit 104 can include one or more hardware processors 1202. The hardware processor(s) 1202 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The main computing unit 104 can also include computer-readable storage media 1204, corresponding to one or more computer-readable media hardware units. The computer-readable storage media 1204 retains any kind of information 1206, such as machine-readable instructions, settings, data (including ink data), etc. Without limitation, for instance, the computer-readable storage media 1204 may include one or more solid-state devices, magnetic storage devices, optical storage devices, etc. Any instance of the computer-readable storage media 1204 may represent a fixed or removable component of the main computing unit 104. Further, any instance of the computer-readable storage media 1204 may provide volatile or non-volatile retention of information.

The main computing unit 104 can utilize any instance of the computer-readable storage media 1204 in different ways. For example, any instance of the computer-readable storage media 1204 may represent a hardware memory unit (such as Random Access Memory (RAM)) for storing transient information during execution of a program by the main computing unit 104, and/or a hardware storage unit (such as a hard disk) for retaining/archiving information on a more permanent basis. In the latter case, the main computing unit 104 also includes one or more drive mechanisms 1208 (such as a hard drive mechanism) for storing and retrieving information from an instance of the computer-readable storage media 1204. The main computing unit 1204 may perform any of the functions described herein when the hardware processor(s) 1202 carry out computer-readable instructions stored in any instance of the computer-readable storage media 1204.

Alternatively, or in addition, the main computing unit 104 may rely on one or more other hardware logic components 1210 to perform operations using a task-specific collection of logic gates. For instance, the hardware logic component(s) 1210 may include a fixed configuration of hardware logic gates, e.g., that are created and set at the time of manufacture, and thereafter unalterable. Alternatively, or in addition, the other hardware logic component(s) 1210 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1212 corresponds to any combination of the hardware processor(s) 1202, the computer-readable storage media 1204, and/or the other hardware logic component(s) 1210. That is, the main computing unit 104 can employ any combination of the hardware processor(s) 1202 that execute machine-readable instructions provided in the computer-readable storage media 1204, and/or one or more other hardware logic component(s) 1210 that perform operations using a fixed and/or programmable collection of hardware logic gates.

The main computing unit 104 also includes an input/output interface 1214 for receiving various inputs (via input devices 1216), and for providing various outputs (via output devices 1218). Illustrative input devices include a digitizer associated with the main display device 110, one or more cameras, one or more movement-detection devices (e.g., accelerometers, gyroscopes, magnetometers, etc.), and so on. The main computing unit 104 may also receive input signals from any input device associated with the writing input device 106. One particular output mechanism may include the main display device 110 and an associated graphical user interface presentation (GUI) 1220.

The computing device 102 can include a device interface 1222 for interacting with the writing input device 106. For example, the device interface 1222 can include a hardware coupling mechanism 1224 (e.g., the electrical connector 314 shown in FIG. 3) for exchanging data with the writing input device 106 via a physical connection. Alternatively, or in addition, the device interface 1222 can include a wireless coupling mechanism 1226 for interacting with the writing input device 106 using wireless signals (e.g., WIFI, BLUETOOTH, etc.). The main computing unit 104 can also include one or more network interfaces 1228 for exchanging data with other devices and systems via one or more computer networks 1230, such as a wide area network (e.g., the Internet), a local area network, etc.

A main power supply 1232 supplies power to the main computing unit 104. For example, the main power supply 1232 can correspond to a connection to an external AC power supply, and/or a rechargeable battery. The main power supply 1232 also may supply power to the writing input device 106 when the writing input device 106 is connected to the main computing unit 104. Finally, one or more communication buses 1234 communicatively couple the above-described components together.

Note that FIG. 12 shows the main computing unit 104 as being composed of a discrete collection of separate units. In some cases, the collection of units may correspond to discrete hardware units provided in a computing device chassis having any form factor. In other cases, the main computing unit 104 can include a hardware logic component that integrates the functions of two or more of the units shown in FIG. 1. For instance, the main computing unit 104 can include a system on a chip (SoC or SOC), corresponding to an integrated circuit that combines the functions of two or more of the units shown in FIG. 12.

Figure 13:
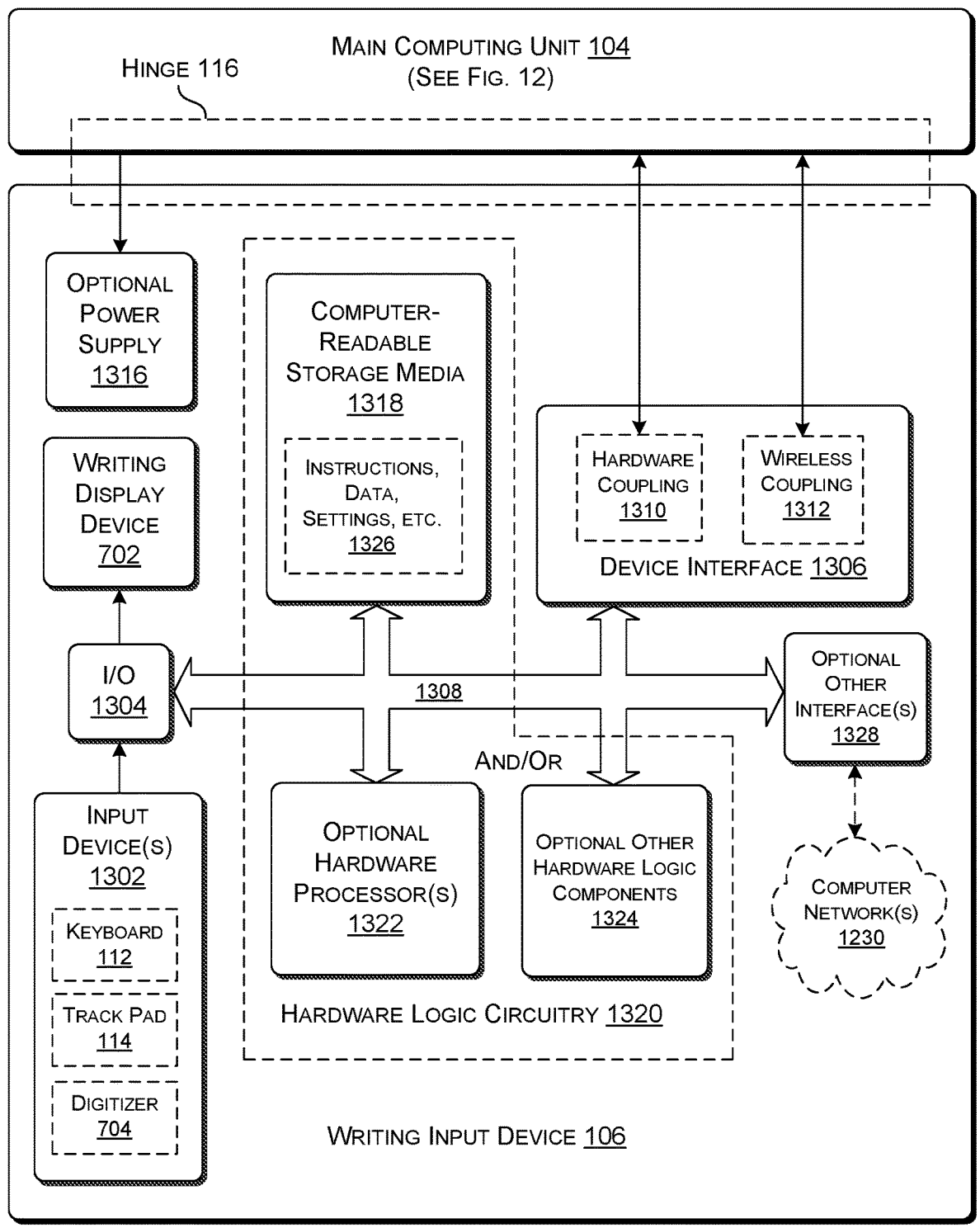
FIG. 13 shows hardware that may be used to implement the writing input device of FIG. 1.

FIG. 13 shows hardware that may be used to implement the writing input device 106 of FIG. 1. Different implementations of the writing input device 106 include different respective subsets of hardware components. In general, in many implementations, the writing input device 106 may include a reduced amount of hardware resources compared to the main computing unit 104 described in FIG. 12.

In a first implementation, the writing input device 106 includes a collection of input devices 1302, such as the keyboard 112, trackpad 114, and the digitizer 704 of the writing surface 402. An input/output interface 1304 transfers input signals provided by the input devices 1302 to a device interface 1306 via a communication bus 1308. The device interface 1306 transfers the input signals to the main computing unit 104 via a hardware coupling mechanism 1310 (such as the electrical connector 312 shown in FIG. 3) and/or via a wireless coupling mechanism 1312. In some implementations, the writing display device 702 of the writing surface 402 displays ink strokes captured by the digitizer 704, and subsequently erases them in response to an erase instruction. The device interface 1306 can also receive content from the main computing unit 104.

In the first implementation, the writing input device 106 can optionally include a power supply 1316 that is separate from the power supply 1232 of the main computing unit 104. For example, the power supply 1316 can include a battery. The battery is charged by the main power supply 1232 when the writing input device 106 is attached to the main computing unit 104. The first implementation may also optionally include computer-readable storage media 1318 for temporarily storing ink data prior to transfer of the ink data to the main computing unit 104, and for storing content received from the main computing unit 104, etc.

A second implementation of the writing input device 106 can add hardware logic circuitry 1320 of any complexity. The hardware logic circuitry 1320 can include one or more hardware processors 1322 of any type(s) described above, and/or any other hardware logic components 1324 of any type(s) described above. The hardware logic circuitry 1320 also includes the computer-readable storage media 1318 of any type(s) described above for retaining any kind of information 1326, such as machine-readable instructions, settings, data (including ink data), etc. The second implementation can optionally include one or more network interfaces 1328 for exchanging data with other devices and systems via one or more computer networks 1230.

Figure 14:
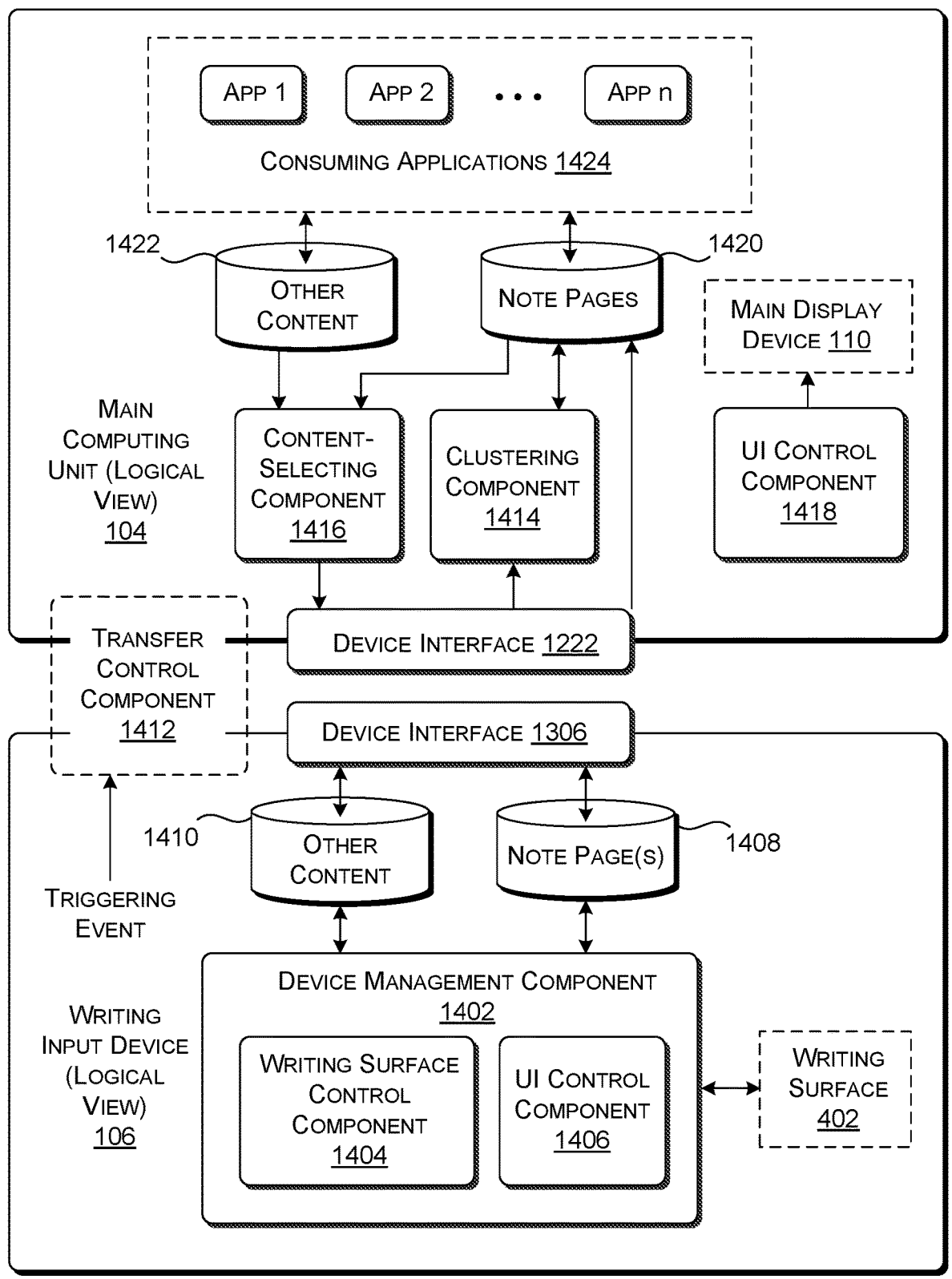
FIG. 14 shows logic components that may be used to implement the main computing unit and the writing input device of FIG. 1.

FIG. 14 shows logic components that may be used to implement the main computing unit 104 and the writing input device 106 of FIG. 1. Each logic component of the main computing unit 104 is implemented by the hardware logic circuitry 1212, of FIG. 12. Each logic component of the writing input device 106 is implemented by the hardware logic circuitry 1320 of FIG. 13.

Referring first to the writing input device 106, a device management component 1402 controls the writing surface 402. For example, a writing surface control component 1404 can store a page of ink data (a "note page" hereinafter) in response to an instruction from a user. The writing surface control component 1404 can also erase the ink strokes shown on the writing surface 402 in response to another instruction from the user. The writing surface control component 1404 also optionally displays content on the writing surface 402, such as a previously stored note page, a document to be marked up of any type (such as a PDF document), and so on.

In one manner of use, the user may create only a single note page prior to transferring it to the main computing unit 104. In other cases, the user may create plural note pages prior to transferring them to the main computing unit 104. In the latter case, the user may activate a "save" and "erase" command after the creation of each note page.

In some implementations, an optional user interface (UI) control component 1406 displays user interface elements on the writing surface 402. For example, the UI control component 1406 can display a menu to the user of available functions that the writing input device 106 may perform. The UI control component 1406 can also receive input signals in response to interaction by the user with the user interface elements.

A data store 1408 may store one or more note pages produced by the user using the writing input device 106. Each note page includes ink data that defines marks made by the user on the writing surface 402. A data store 1410 stores other content that may be presented on the writing surface 402, such as non-marked-up documents and marked-up documents. A marked-up document refers to a document with supplemental ink strokes added by the user. A non-marked-up document corresponds to a document which does not yet have any such ink strokes.

Alternatively, or in addition, the writing input device 106 can store any content (ink data, documents, etc.) in a remote system, such as a remote server, accessible to the writing input device 106 via the network interface(s) 1328.

A transfer control component 1412 transfers any new ink data that has been produced to the main computing unit 104 upon the occurrence of a triggering event. FIG. 14 shows the transfer control component 1412 as straddling the writing input device 106 and the main computing unit 104 to indicate that it corresponds to logic that can be implemented by the writing input device 106, or the main computing unit 104, or a combination of the writing input device 106 and the main computing unit 104.

In one case, a triggering event corresponds to an indication that the user has reconnected the writing input device 106 to the main computing unit 104. The transfer control component 1412 can determine that this triggering has occurred when it receives an input signal from the device interface 1306, indicating that the writing input device 106 has been connected to the main computing unit 104. In response to this triggering event, the transfer control component 1412 transfers any new ink data to the main computing unit 104, including one or more new ink pages, one or more new marked-up documents, etc. In another case, a triggering event corresponds to an explicit instruction from the user. In another case, the transfer control component 1412 is configured to periodically transfer any new ink data stored by the writing input device 106 to the main computing unit 104; here, a triggering event corresponds to an indication that it is time to send the new in data to the main computing unit 104. Still other triggering events can be used to initiate the transfer of new ink data to the main computing unit 104. In addition, the transfer control component 1412 can transfer content of any type from the main computing unit 104 to the writing input device 106, including one or more prior note pages, one or more documents to be marked up, and so on.

Now referring the main computing unit 104, an optional clustering component 1414 organizes notes pages received from the writing input device 106 into one or more note categories. Additional information regarding the operation of the clustering component 1414 is provide below in connection with FIGS. 15-17. An optional content-selecting component 1416 selects content to be sent to the writing input device 106 based on context information. Additional information regarding the operation of the content-selecting component 1416 is provided below in conjunction with FIGS. 18-19. A UI control component 1418 displays user interface elements on the main display device 110. Additional information regarding the operation of the UI control component 1418 is provided below in connection with FIG. 20. In one implementation, the clustering component 1414, the content-selecting component 1416, and the UI control component 1418 represent functionality provided by an operating system of the main computing unit 104.

Note that FIG. 14 shows that the clustering component 1414 and the content-selecting component 1416 are implemented by the main computing unit 104. In other implementations, either (or both) of these components can be implemented in whole or in part by the writing input device 106.

A data store 1420 stores note pages received from the writing input device 106 and/or independently created using the main computing unit 104. A data store 1422 stores other content of any nature, such as marked-up and non-marked-up documents of type(s). Alternatively, or in addition, the main computing unit 104 can store any content (ink data, documents, etc.) in a remote system, such as a remote server, accessible to the main computing unit 104 via the interface(s) 1228.

A storage utility component (not shown) manages the storage of content in the data stores (1420, 1422). In a first scenario, a user may download an existing note page to the writing input device 106, modify the note page using the input writing device 106, and then send the modified note page back to the main computing unit 104. The storage utility component can handle this situation in any environment-specific manner, such as by automatically replacing the previously stored note page in the data store 1420 with the updated note page, or by replacing that existing note page only upon receiving confirmation from the user, etc.

In a second scenario, a user may download an existing note page to the writing input device, modify the note page at the main computing unit 104 to produce a first modification, modify the same note page at the writing input device 106 to produce a second modification, and then upload the second modification to the main computing unit 104. The storage utility component can handle this situation in any environment-specific manner, such as by inviting the user to specify whether the first or second modification should be stored, or by merging the first modification with the second modification. The storage utility can handle conflicts in any environment-specific manner. For example, if the first and second modifications affect the same ink stroke, then the storage utility can save the version having the most recent creation time, or save the version based on a preference setting by the user.

The main computing unit 104 also includes a collection of consuming applications 1424 of any type(s). One or more of the applications may allow the user to create, modify, and/or read the note pages provided in the data store 1420.

The computing device 102 described in FIGS. 12-14 has various technical features that promote the efficient processing of ink data. For example, the writing input device 106 consumes less power than the main computing unit 104. This is because the main computing unit 104 may serve as a general-purpose computing device which hosts a set of applications 1424 and other functions. In contrast, when detached from the main computing unit 104, the writing input device 106 is dedicated to a narrow set of functions, such as collecting ink data using the writing surface 402. Further, the writing surface 402 can employ a low-power writing display device 702, such as an electronic paper display device, or a ChLCD display device, etc. Such a writing display device 702 does not consume power unless its display state changes.

Figure 15:
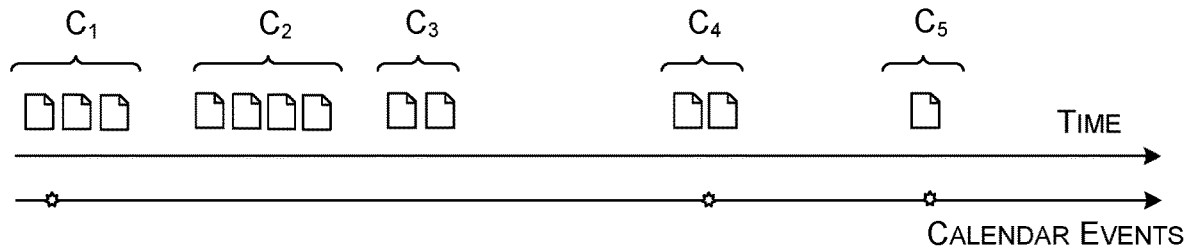
FIG. 15 shows a series of note pages produced by the writing input device of FIG. 1.

FIG. 15 shows a series of note pages produced by the writing input device 106 of FIG. 1 over a span of time. For instance, assume that a student takes a first series $C_1$ of note pages in a first class, a second series $C_2$ of note pages in a second class, a third series $C_3$ of notes pages in a third class, a fourth series of note pages $C_4$ upon meeting a friend at a coffee shop, and a fifth series $C_5$ of note pages at dinner that evening. Assume that the subject matter of each group of note pages differs from the subject matter of other groups of notes pages.

Further assume that the writing input device 106 stores metadata for each note page that describe at least the time at which the note page was saved. Optionally, the writing input device 106 can also store location coordinates that describe the location at which the note page was saved (e.g., based on information provided by a GPS location-determination component), and so on. Further assume that a calendar system stores a calendar for the student. The calendar records an entry for the student's first class, an entry for the coffee shop meeting, and an entry for the evening dinner.

The goal of the clustering component 1414 is to automatically identify the members of each group of notes described above, without necessarily having explicit labeling information which identifies the category of each note page. The clustering component 1414 performs this task based on factor information associated with each note page. With respect to any note page under consideration, the factor information describes at least one characteristic associated with the note page, such as, without limitation: (a) the characteristics of its ink data (referred to as ink information); (b) the time it was saved (referred to as time information); (c) the location at which it was saved (referred to as location information); (d) any calendar data associated with the time at which it was saved (referred to as calendar information), and so on.

Figure 16:
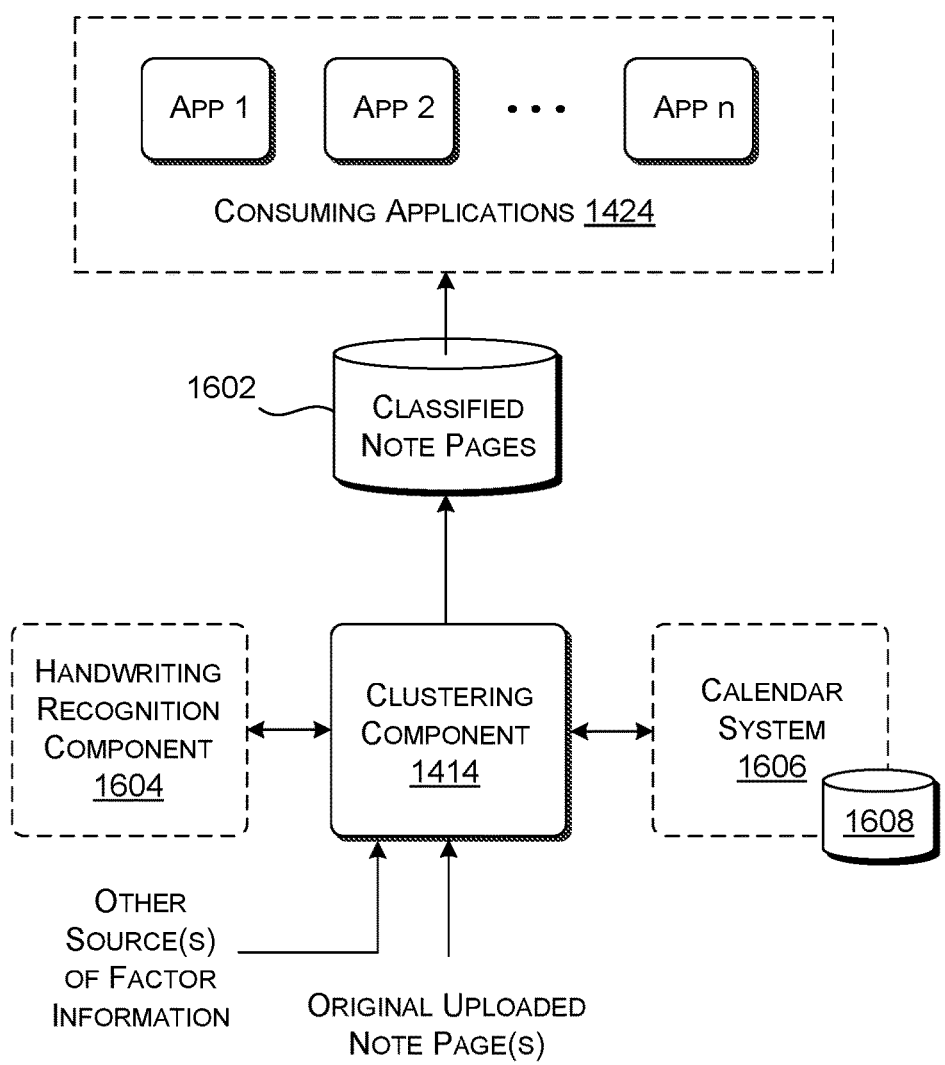
FIG. 16 shows a clustering component for clustering the note pages of FIG. 15 based on received factor information.

FIG. 16 provides an overview of the operation of the clustering component 1414. The clustering component 1414 can receive a set of original note pages uploaded from the writing input device 106 by the transfer control component 1412. The clustering component 1414 clusters the original set of note pages into one or more groups. As an output, the clustering component 1414 can add metadata to each note page which specifies its category. Or it can store each group of note pages in an appropriate group folder associated with its category, etc. The clustering component 1414 can store the thus-classified note pages in a data store 1602 (e.g., which may correspond to the data store 1420 shown in FIG. 14). The consuming applications 1424 can operate on the classified (or original) note pages in any application-specific manner.

The clustering component 1414 receives factor information from one or more sources. One source includes a handwriting recognition component 1604. The handwriting recognition component 1604 may map the ink data associated with a note page into recognized alphanumeric characters, words, geometric shapes, etc. associated with a note page. The handwriting recognition component 1604 can perform this task using any technique, such as a machine-trained neural network, a machine-trained feature classifier, a Hidden Markov Model (HMI), etc.

Another source of factor information is a calendar system 1606 which provides a calendar associated with a user in a data store 1608. The calendar system 1606 may be locally implemented by the main computing unit 104. Alternatively, or in addition, the calendar system 1606 may be implemented by a remote computing device (e.g., a remote server or servers), to which the main computing unit 104 has access via its network interface(s) 1228.

Another source of factor information includes metadata associated with the original note pages, e.g., as provided by the writing input device 106. For example, the clustering component 1414 may receive time information and location information based on metadata associated with a note page.

Figure 17:
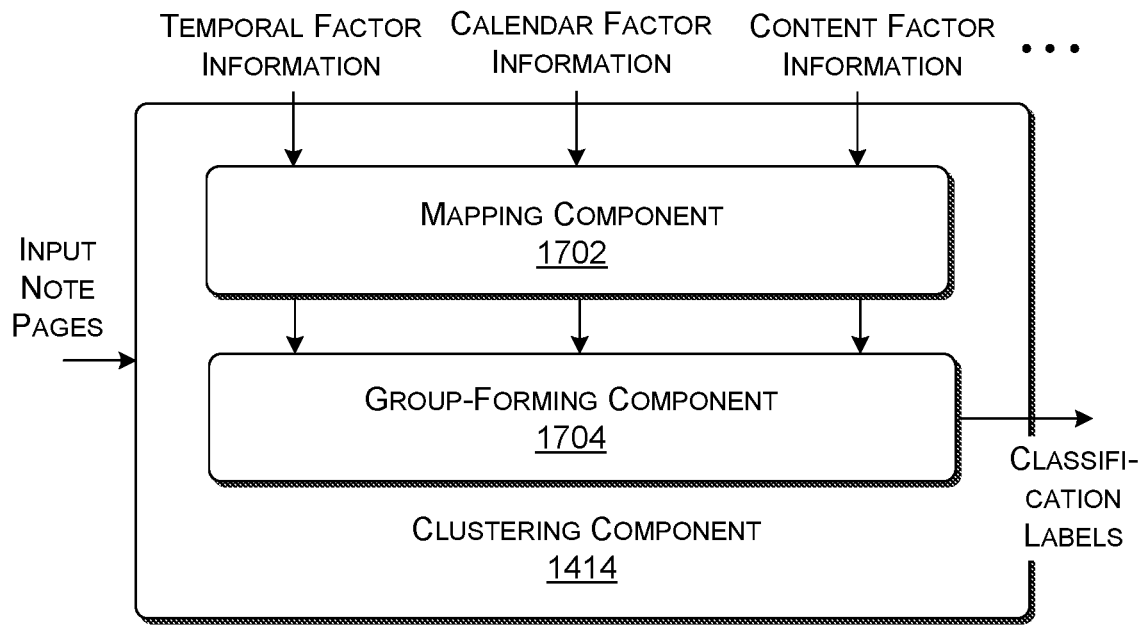
FIG. 17 shows a more detailed illustrative implementation of the clustering component of FIG. 16.

FIG. 17 shows one illustrative implementation of the clustering component 1414 of FIG. 16. In this case, the clustering component 1414 can include a machine-trained mapping component 1702 that maps the factor information associated each input note page into a set of one or more input vectors, such as one or more one-hot vectors. The mapping component 1702 can perform this task using a lookup or hashing table, a machine-trained model, etc. The mapping component 1702 then transforms the input vector(s) into an output vector in a low-dimensioned semantic space. The mapping component 1702 can perform this task using a deep neural network of any type, such as a convolutional neural network, etc. The distance between any two output vectors in that semantic space (e.g., as measured by cosine similarity or some other distance metric) reflects the similarity between the two note pages associated with the output vectors. A group-forming component 1704 then clusters the output vectors into one or more categories of note pages using any clustering algorithm, such as a machine-trained clustering model, a k-means clustering algorithm, etc.

Generally, a feedforward deep neural network can include N layers of neurons that map an input vector $z_1$ into an output vector y. The values in any layer j may be given by the formula, $z_j = f(W_j z_{j-1} + b_j)$, for j=2, . . . N. The symbol $W_j$ denotes the j-th weight matrix produced by a training system, and the symbol $b_j$ refers to an optional j-th bias vector, also produced by the training system. The function $f(x)$, referred to as the activation function, can be formulated in different ways, such as the tan h function. The training system can produce the model's parameter values (weight matrices and bias vectors) by operating on a set of training examples. It can perform this task using any iterative computational technique (such gradient descent), to progressively reduce classification error. An illustrative training example may include a note page together with its known classification.

In another implementation (not shown), the clustering component 1414 includes a machine-trained classification component that maps the factor information associated with each note page into a label. The label specifies the category to which the note page most likely pertains. For example, the machine-trained classification component can apply a linear regression model, a decision tree model, etc.

In another implementation (not shown), the clustering component 1414 includes a first machine-trained classification component for generating a score for a note page based on time information, a second machine-trained classification component for generating a score based on calendar information, a third machine-trained classification component for generating a score based on ink information, and so on. Another machined-trained classification component then maps these various scores into a final label. That label specifies the category to which the note page most likely pertains.

In another implementation, the clustering component 1414 can use one or more discrete algorithms to identify the category to which each page likely pertains. For example, the clustering component 1414 can consider any two consecutive note pages as belonging to a same category of note pages if: (a) the two pages were saved at times separated by no more than a specified interval of time; (b) and/or if the two pages are saved at the same location; (c) and/or if the two pages include text and/or drawing ink data that includes similar content, which can be assessed by measuring the distance between the ink data associated with the two pages using any distance metric (such as cosign similarity), and comparing that distance to a threshold value, and so on.

Overall, the clustering component 1414 helps the user organize ink data that the user has created using the writing input device 106. Without this provision, the user would need to manually examine each note page, and manually label it or manually add it to an appropriate topic-specific folder.

Figure 18:
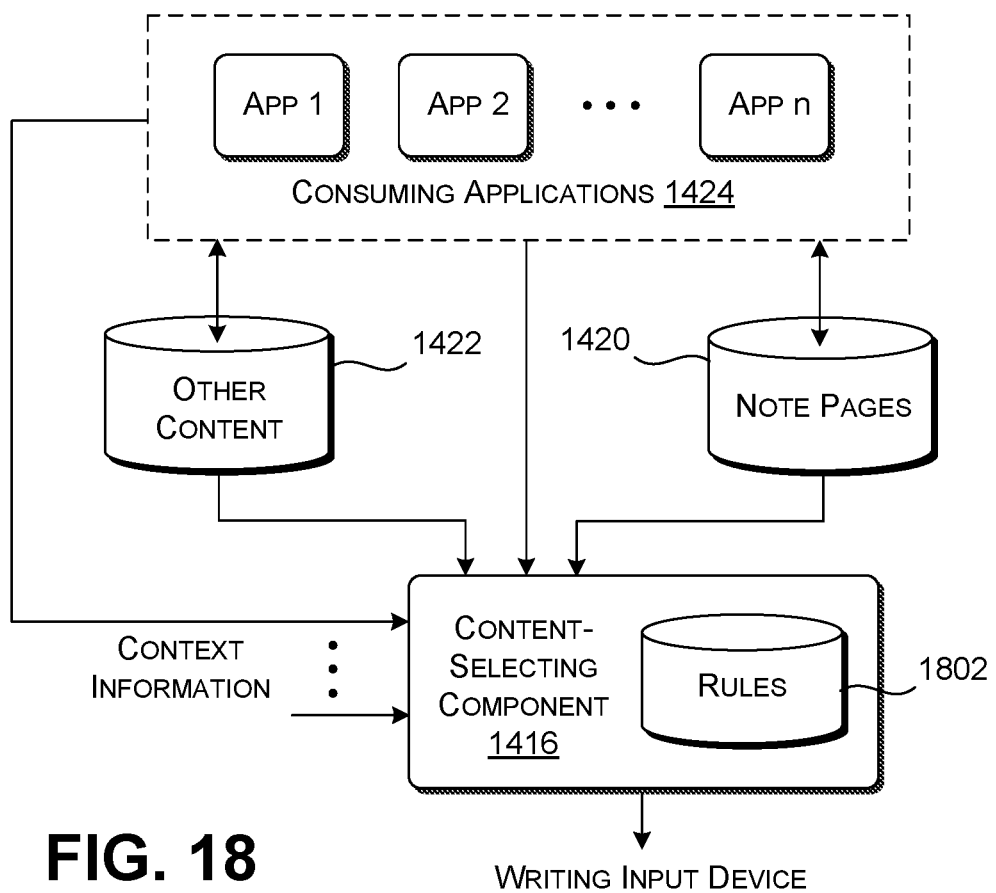
FIG. 18 shows a content-selecting component for identifying content based on context information, and for transferring that content to the writing input device, for presentation thereat.

FIG. 18 shows one implementation of the content-selecting component 1416. The content-selecting component 1416 identifies content to be sent to the writing input device 106 for presentation on the writing input device 106. The content-selecting component 1416 receives context information (expressed by input signals) from various sources which describes a current context affecting the user. For example, without limitation, the context information can identify: an application (or applications) that a user is currently interacting with via the main computing unit 104; a document (or documents) that a user is currently interacting with via the computing device 102; a current location of the user; a current time, etc. The content-selecting component 1416 can map the context information into an indication of content (if any) to be presented to the writing input device 106. In one implementation, the content-selecting component 1416 can perform its mapping operation using a set of rules provided in a data store 1802. For example, one rule can indicate that, IF the user is currently interacting with a document of type X, THEN any notes associated with the document should be transferred to the writing input device 106. Any rule may also specify the conditions under which the identified content is to be transferred to the writing input device 106, such as the timing at which the identified content is to be transferred. The content-selecting component 1416 determines an appropriate rule to apply for a given situation by using the current context information as a lookup key to find a rule with matching context information, if any.

In some implementations, the content-selecting component 1416 can also include a configuration component (not shown) which allows a user to create custom rules based on the user's preferences. For example, the user may prefer to send a document of type A to the writing input device 106 whenever it is opened on the main computing unit 104 at a particular geographical location, but not a document of type B. The user may create a rule which expresses those preferences.

Figure 19:
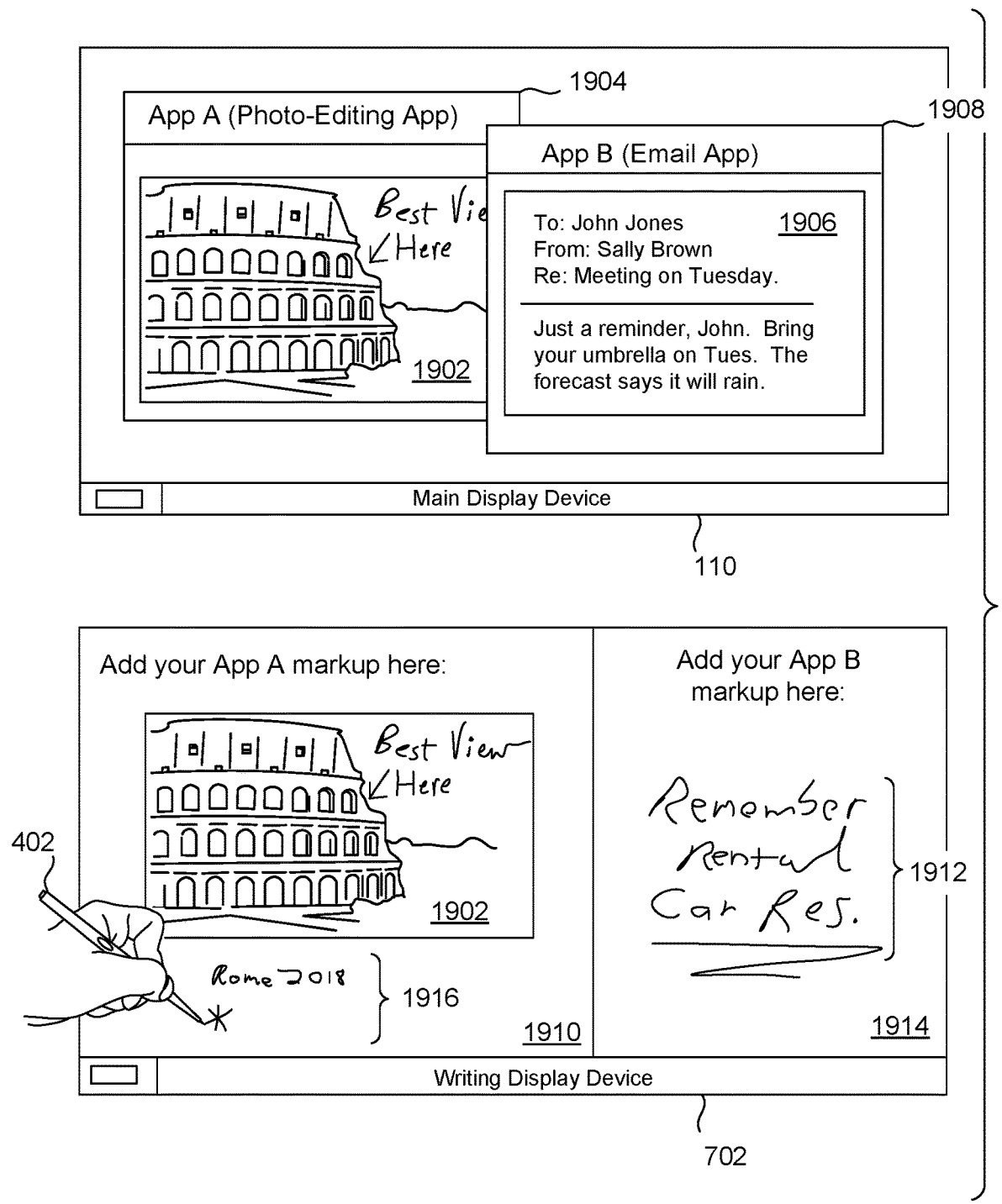
FIG. 19 shows an example of the operation of the content-selecting component of FIG. 18.

FIG. 19 shows an example of the operation of the content-selecting component 1416 of FIG. 18. In this case, assume that a user is currently viewing a previously marked-up digital photograph 1902 using a photo-editing application 1904 (App A) on the main display device 110 of the main computing unit 104. Further, assume that the user is currently interacting with an Email message 1906 using an Email application 1908 on the main display device 110.

In response to detecting this context, the content-selecting component 1416 automatically selects the marked-up digital photograph 1902 as appropriate content to be transferred to the writing input device 106. The transfer control component 1412 then transfers this content to the writing input device 106. Upon receiving the digital photograph 1902, the writing input device 106 displays it on a first portion 1910 of the writing display device 702. Further assume that the content-selecting component 1416 automatically selects a stand-alone note page 1912 associated with the Email message 1906 as appropriate content to be transferred to the writing input device 106. The transfer control component 1412 then transfers this content to the writing display device 106. Upon receiving the note page 1912, the writing input device 106 displays it in a second portion 1914 of the writing display device 702. The content-selecting component 1416 performs the above-described actions based on one or more rules provided in the data store 1802.

The transfer control component 1412 can transfer content to the writing input device 106 in an environment-specific manner, such as by immediately transferring the content once it is identified by the content-selection component 1416 (e.g., by using wireless transmission if the writing input device 106 is not currently physically coupled to the main computing unit 104), or by waiting until the writing input device 106 is physically coupled to the main computing unit 104.

The user may thereafter add further ink strokes to any content displayed by the writing display device 702. For example, in the example shown in FIG. 19, the user has created a caption 1916 to accompany the digital photograph 1902. The writing input device 106 can store this caption as a separate note page associated with the digital photograph 1902. Upon the occurrence of a triggering event (such as the reattachment of the writing input device 106 to the main computing unit 104), the writing input device 106 can transfer any new ink data to the main computing unit 104, including the caption 1916.

In another example, the current context indicates that the user is currently in a classroom at a particular time. In response, the content-selecting component 1416 retrieves one or more of the user's note pages associated with a class that is being held in the classroom at that time. The transfer control component 1412 then transfers those note page(s) to the writing input device 106.

The content-selecting component 1416 is helpful to the user because it assists the user in transferring content to the writing input device 106. Without this provision, the user would need to manually select each piece of content that he or she wishes to later interact with via the writing input device 106, and instruct the transfer control component 1412 to transfer it to the writing input device 106.

Figure 20:
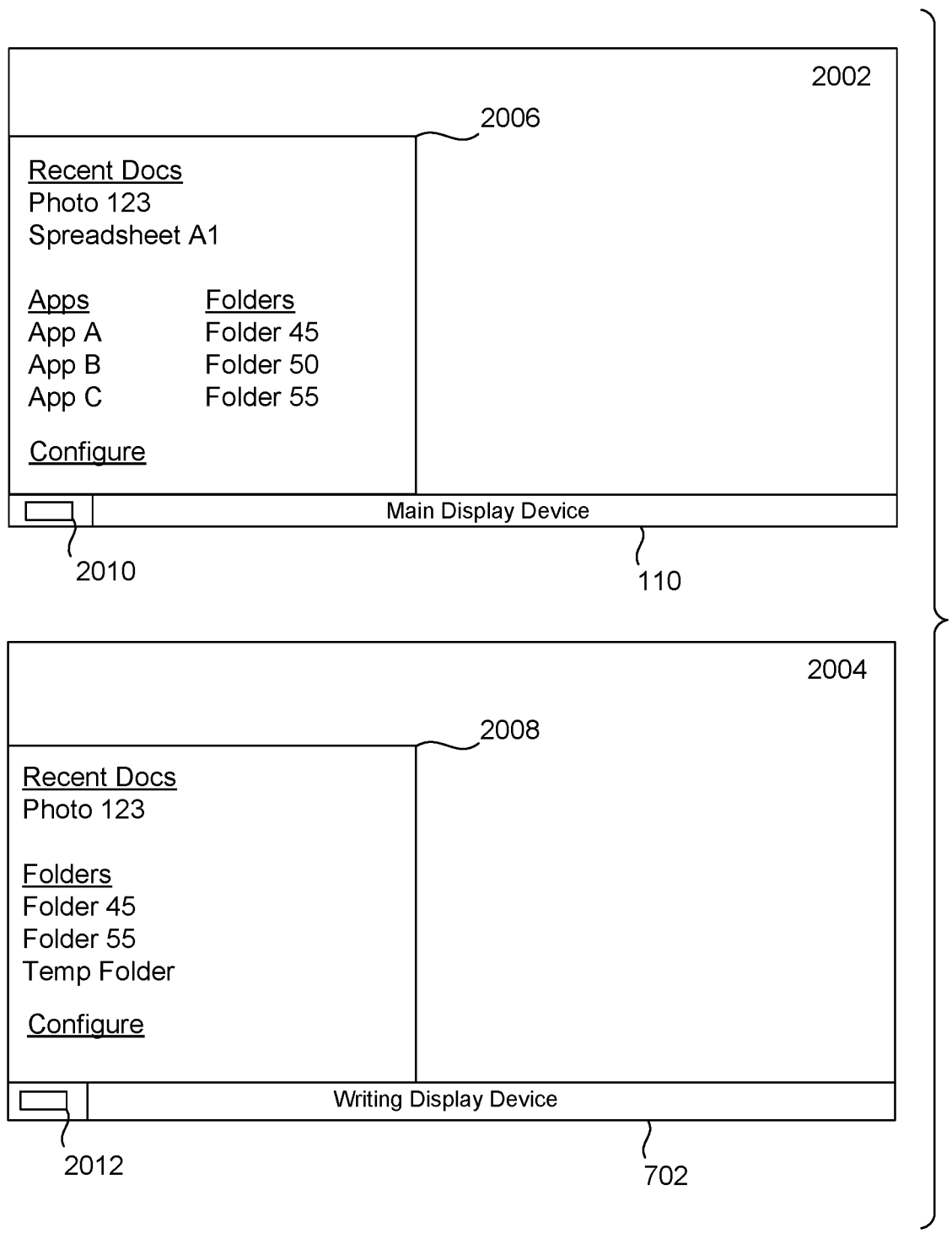
FIG. 20 shows user interface presentations presented by UI control components provided by the main computing unit and the writing input device of FIG. 1, respectively.

FIG. 20 shows an example of a user interface presentation 2002 provided by the UI control component 1418 on the main display device 110, and a user interface presentation 2004 provided by the UI control component 1406 on the writing display device 702. The UI control component 1418 presents a first set of user interface options (and corresponding user interface elements) to a user for consumption via the main computing unit 104, while the UI control component 1406 presents a second set of user interface options (and corresponding user interface elements) to a user for consumption via the writing input device 106. In one implementation, the first set of user interface options is more complex (e.g., includes a greater number) than the second set of user interface options. But in one implementation, the two UI control components (1418, 1406) present their respective user interface options using a same base user interface framework. For example, both UI control components (1418, 1406) may present two respective menus (2006, 2008) that have the same organizational structure, relative location on the respective user interface presentations (2002, 2004), visual font and/or graphics appearance, etc. Further, both UI control components (1418, 1406) can present the two menus (2006, 2008) to the user in response to the user performing the same activation action, e.g., in response to a user activating respective start icons (2010, 2012). But the two menus (2006, 2008) otherwise include different respective sets of user interface options. For example, the menu 2006 can include a set of options appropriate to all of the diverse functions performed by the main computing unit 104, while the menu 2008 can includes a reduced set of options associated with the functions performed by the writing surface 402, some or all of which may also be performed by the main computing unit 104.

The approach described above is beneficial because it gives the user a consistent user interface experience across the main computing unit 104 and the writing input device 106. Further, the approach makes efficient use of computing resources, e.g., because the computing device 102 can use a common set of underlying UI resources to implement both of the UI control components (1418, 1406).

B. Illustrative Processes

Figure 23:
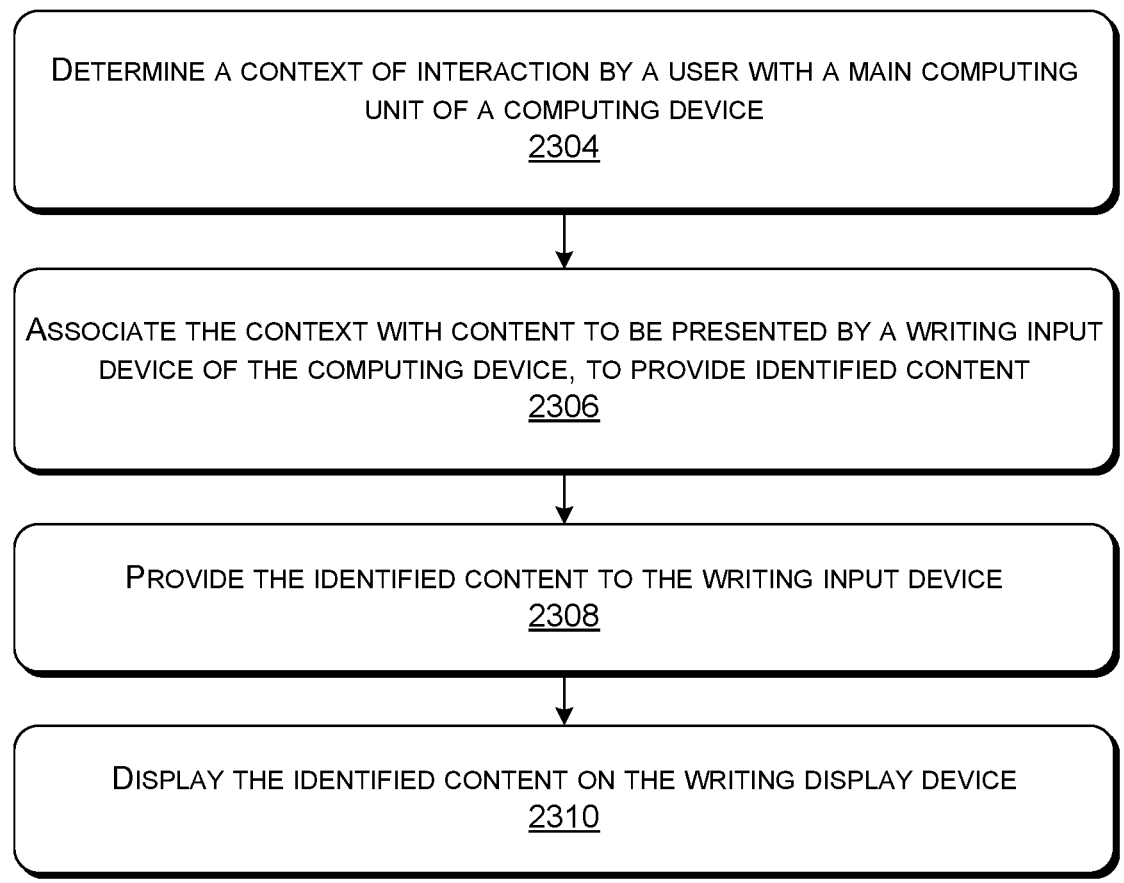
FIG. 23 shows a process that describes one manner of operation of the content-selecting component of FIG. 18.

FIGS. 21-23 together show processes that explain the operation of the computing device 102 of Section A in flowchart form. Since the principles underlying the operation of the computing device 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 21 shows a process 2102 that describes one manner of operation of the computing device 102 of FIG. 1. In block 2104, the writing input device 106 receives ink data as a user draws on the writing surface 402 of the writing input device 106. In block 2106, the writing input device 106 displays ink strokes on the writing surface 402 associated with the ink data that has been captured by the writing surface 402. In block 2108, the writing input device 106 optionally stores the ink data in a data store (e.g., data store 1408 and/or data store 1410). In block 2110, the transfer control component 1412 detects the occurrence of a triggering event (such as the reconnection of the writing input device 106 to the main computing unit 104). In block 2112, in response to the triggering event, the transfer control component 1412 transfers the ink data from the data store (1408, 1410) of the writing input device 106 to the main computing unit 104. The transfer control component 1412 can be implemented by the writing input device 106, the main computing unit 104, or a combination thereof.

FIG. 22 shows a process 2202 that describes one manner of operation of the clustering component 1414 of FIGS. 16 and 17. In block 2204, the clustering component 1414 receives plural note pages produced by the writing input device 106. The plural note pages are produced by the writing input device 106 over a span of time. In block 2206, the clustering component 1414 receives factor information from at least one source that describes one or more characteristics of the plural note pages. In block 2208, the clustering component 1414 groups the plural note pages into one or more categories of notes based the factor information that is received.

FIG. 23 shows a process 2302 that describes one manner of operation of the content-selecting component 1416 of FIG. 18. In block 2304, the content-selecting component 1416 determines a context that currently affects the user, such as the manner in which the user is currently interacting with the main computing unit 104, the user's current location, the current time, etc. In block 2306, the content-selecting component 1416 associates the context with content to be presented by the writing input device 106, to provide identified content. In block 2308, the transfer control component 1412 provides the identified content to the writing input device 106. In block 2310, the writing input device 106 displays the identified content on the writing display device 702.

The following summary provides a non-exhaustive set of illustrative aspects of the technology set forth herein.

According to a first aspect, a computing device is described for capturing handwritten marks. The computing device includes a main computing unit including a main display device and a writing input device. The writing input device includes a keyboard provided on a first portion of the writing input device, and a writing surface provided on a second portion of the writing input device. The writing surface includes a digitizer for capturing ink data in response to a user drawing on the writing surface, and a writing display device for displaying ink strokes associated with the ink data that has been captured by the digitizer. The computing device also includes a connecting mechanism that detachably couples the main computing unit to the writing input device, and a transfer control component configured to transfer the ink data captured by the writing input device to the main computing unit upon a triggering event. The transfer control component is implemented by hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The writing input device consumes less power than main computing unit.

According to a second aspect, the triggering event corresponds to reconnection of the writing input device to the main computing unit.

According to a third aspect, the first portion of the writing input device corresponds to a first side of the writing input device, and the second portion of the writing input device corresponds to a second side of the writing input device, the second side being opposite to the first side.

According to a fourth aspect, the writing surface extends over at least half of a surface area of the second side.

According to a fifth aspect, the first portion of the writing input device and the second portion of the writing input device are provided on a same side of the writing input device.

According to a sixth aspect, the computing device further includes a hinge between the main computing unit and the writing input device, which provides movement of the main computing unit relative to the writing input device when the main computing unit is connected to the writing input device via the connecting mechanism.

According to a seventh aspect, the computing device further includes a clustering component, implemented by the hardware logic circuitry, configured to: receive plural note pages produced by the writing input device over a span of time; receive factor information from at least one source that describes one or more characteristics of the plural note pages; and group the plural note pages into one or more categories of notes based the factor information that is received.

According to an eighth aspect, one kind of factor information corresponds to time information, describing respective times at which the plural note pages have been created.

According to a ninth aspect, one kind of factor information corresponds to calendar information associated with the plural note pages, the calendar information being received from a data store provided by a calendar system.

According to a tenth aspect, one kind of factor information corresponds to recognized ink information, describing features of ink data associated with the plural note pages, as recognized by a handwriting recognition component.

According to an eleventh aspect, the computing device further includes a content-selecting component, implemented by the hardware logic circuitry, configured to: determine a current context affecting a user; and associate the context with content to be presented by the writing input device, to provided identified content. The transfer control component is configured to provide the identified content to the writing input device. The writing input device is configured to display the identified content on the writing display device.

According to a twelfth aspect, the context identifies an application/or document that a user has activated via the main computing unit.

According to a thirteenth aspect, the main computing unit includes a first user interface (UI) control component, implemented by the hardware logic circuitry, for presenting a first set of user interface options to a user via the main display device. The writing input device includes a second user interface (UI) control component, implemented by the hardware logic circuitry, for presenting a second set of user interface options to the user via the writing display device. The first UI control component and the second UI control component present their respective user interface options using a same base user interface framework, but the second set of user interface options is simplified relative to the first set of user interface options.

According to a fourteenth aspect, a method is described for capturing handwritten marks using a computing device. The method includes: receiving ink data captured by a writing surface of a writing input device, as a user draws on the writing surface; displaying ink strokes on the writing surface associated with the ink data that has been captured; storing the ink data in a data store provided by the writing input device; detecting occurrence of a triggering event; and in response to the triggering event, transferring to the ink data from the data store of the writing input device to a main computing unit. The computing device has a connecting mechanism that detachably couples the main computing unit to the writing input device, and the writing input device also includes a keyboard.

According to a fifteenth aspect (dependent on the fourteenth aspect), the triggering event corresponds to reconnection of the writing input device to the main computing unit.

According to a sixteenth aspect (dependent on the fourteenth aspect), the writing surface is provided on a first side of the writing input device, and the keyboard is provided on a second side of the writing input device, the second side being opposite to the first side.

According to a seventeenth aspect (dependent on the fourteenth aspect), the ink data that is transferred to the main computing unit is organized into plural note pages produced over a span of time. Further, the method includes: receiving factor information from at least one source that describes one or more characteristics of the plural note pages; and grouping the plural note pages into one or more categories of notes based the factor information that is received.

According to an eighteenth aspect (dependent on the fourteenth aspect), the method further includes: determining a current context affecting a user; associating the context with content to be presented by the writing input device, to provide identified content; providing the identified content to the writing input device; and displaying the identified content on the writing display device.

According to a nineteenth aspect, a computer-readable storage medium for storing computer-readable instructions is described. The computer-readable instructions, when executed by one or more hardware processors, perform a method that includes: receiving plural note pages produced by a writing input device of a computing device, the plural note pages being produced over a span of time; receiving factor information from at least one source that describes one or more characteristics of the plural note pages; and grouping the plural note pages into one or more categories of notes based the factor information that is received. The operations of receiving plural note pages, receiving factor information, and grouping are performed by a main computing unit. Further, the computing device has a connecting mechanism that detachably couples the main computing unit to the writing input device.

A twentieth aspect corresponds to any combination (e.g., any permutation or subset that is not logically inconsistent) of the above-referenced first through nineteenth aspects.

A twenty-first aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twentieth aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device for capturing handwritten marks, comprising:
 a main computing unit including a main display device;
 a writing input device including:
  a keyboard provided on a first portion of the writing input device; and
  a writing surface provided on a second portion of the writing input device, the writing surface including a digitizer for capturing ink data in response to a user drawing on the writing surface, and a writing display device for displaying ink strokes associated with the ink data that has been captured by the digitizer;

a connecting mechanism that detachably couples the main computing unit to the writing input device;

a transfer control component configured to transfer the ink data captured by the writing input device to the main computing unit upon a triggering event; and a content-selecting component configured to:
receive context information from one or more sources that describes a given context affecting the user;
determine a rule to apply to the given context based on the context information, to provide a selected rule, the selected rule being chosen by performing a lookup operation within a set of rules in a rules data store;
apply the selected rule to identify content to be operated upon by the user using the writing input device, to provide identified content;
send the identified content to the writing input device;
store the identified content in the writing input device; and
display the identified content on the writing surface of the writing input device, the transfer control component and the content-selecting component being implemented by hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates, and the writing input device consuming less power than main computing unit.

2. The computing device of claim 1, wherein the triggering event corresponds to reconnection of the writing input device to the main computing unit.

3. The computing device of claim 1, wherein the first portion of the writing input device corresponds to a first side of the writing input device, and wherein the second portion of the writing input device corresponds to a second side of the writing input device, the second side being opposite to the first side.

4. The computing device of claim 1,
wherein the main computing unit includes a first user interface (UI) control component, implemented by the hardware logic circuitry, for presenting a first set of user interface options to the user via the main display device,
wherein the writing input device includes a second user interface (UI) control component, implemented by the hardware logic circuitry, for presenting a second set of user interface options to the user via the writing display device, and
wherein the first UI control component and the second UI control component present their respective user interface options using a same base user interface framework,
wherein the second set of user interface options is associated with functions that are performed by the writing input device when detached from the main computing unit, and excludes at least one user interface option that is associated with a function performed by the main computing unit but not the writing input device.

5. The computing device of claim 1, wherein the writing input device includes a receptacle for storing a pen.

6. A method for capturing handwritten marks using a computing device, comprising:
receiving context information from one or more sources that describes a given context affecting a user,
the computing device having a main computing unit, a writing input device, and a connecting mechanism that detachably couples the main computing unit to the writing input device;
determining a rule to apply to the given context based on the context information, to provide a selected rule, the selected rule being chosen from a set of rules in a rules data store;
applying the selected rule to identify content to be operated upon by the user using the writing input device, to provide identified content;
sending the identified content to the writing input device;
storing the identified content in the writing input device;
displaying the identified content on a writing surface of the writing input device;
receiving ink data captured by the writing surface of the writing input device while the writing input device is detached from the main computing unit as the user draws on the writing surface in relation to the identified content;
displaying ink strokes on the writing surface associated with the ink data that has been captured;
storing the ink data in a data store provided by the writing input device;
detecting occurrence of a triggering event; and
in response to the triggering event, transferring the ink data from the data store of the writing input device to the main computing unit.

7. The method of claim 6, wherein the selected rule specifies that identified content is to be sent to the writing input device in response to the user activating an application on the main computing unit of a prescribed type.

8. The method of claim 6, wherein the selected rule specifies that identified content is to be sent to the writing input device in response to the user activating a document on the main computing unit of a prescribed type.

9. The method of claim 6, wherein the selected rule specifies that the identified content is to be sent to the writing input device based on an identified location of the user.

10. The method of claim 6, wherein the selected rule also specifies a time at which the identified content is to be sent to the writing input device.

11. The method of claim 6, further including receiving a custom rule specified by the user, and storing the custom rule in the rules data store.

12. The method of claim 6, wherein the identified content that is sent corresponds to a document or image.

13. The method of claim 6, wherein the identified content that is sent corresponds to ink data previously created by the user using the writing input device.

14. The method of claim 6, further comprising displaying the identified content in two or more portions of a user interface presentation provided by the writing surface, each portion being associated with an application provided by the main computing unit.

15. The method of claim 6, wherein the identified content is a document or image, and wherein the ink data captured by the writing surface after said sending corresponds to markup content added to the document or image.

16. The method of claim 6, wherein the identified content corresponds to at least one note page previously created by the user using the writing input device, and wherein the ink data captured by the writing surface after said sending corresponds to one or more additional note pages.

17. The method of claim 6, wherein the ink data transferred to the main computing unit corresponds to at least one note page, and wherein the method further includes reconciling said at least one note page with another version of said at least one note page provided by the main computing unit.

18. A computer-readable storage medium for storing computer-readable instructions, the computer-readable instructions, when executed by one or more hardware processors provided by a computing device, performing a method that comprises:

receiving context information from one or more sources that describes a given context affecting a user, the computing device having a main computing unit, a writing input device, and a connecting mechanism that detachably couples the main computing unit to the writing input device;

determining a rule to apply to the given context based on the context information to provide a selected rule, the selected rule being chosen from a set of rules in a rules data store;

at least one rule depending on context information that identifies an application that the user has activated via the main computing unit;

at least one rule depending on context information that identifies a document or image that the user has activated via the main computing unit; and at least one rule depending on context information that specifies an identified location of the user;

applying the selected rule to identify content to be operated upon by the user using the writing input device, to provide identified content;

sending the identified content to the writing input device; and in response to a triggering event, receiving ink data captured by a writing surface of the writing input device while the writing input device is detached from the main computing unit, the ink data being captured as the user draws on the writing surface in relation to the identified content that was sent to the writing input device.

19. The computer-readable storage medium of 18, wherein the identified content that is sent to the writing input device corresponds to at least one note page previously created by the user using the writing input device, and wherein the ink data received by the main computing unit corresponds to one or more additional note pages.

20. The computer-readable storage medium of claim 18, wherein the identified content that is sent to the writing input device is a document or image, and wherein the ink data received by the main computing unit includes markup content added to the document or image.

* * * * *